United States Patent
Merrill et al.

(10) Patent No.: US 10,628,204 B2
(45) Date of Patent: Apr. 21, 2020

(54) VIRTUAL COMMUNICATION ROUTER WITH TIME-QUANTUM SYNCHRONIZATION

(71) Applicant: Performance Software Corporation, Phoenix, AZ (US)

(72) Inventors: Daniel J. Merrill, Goodyear, AZ (US); Darrell A. Leinwand, Phoenix, AZ (US); James W. Breese, Peoria, AZ (US); Steven D. Belle, Glendale, AZ (US)

(73) Assignee: PERFORMANCE SOFTWARE CORPORATION, Phoenix, AZ (US)

( * ) Notice: Subject to any disclaimer, the term of this patent is extended or adjusted under 35 U.S.C. 154(b) by 213 days.

(21) Appl. No.: 15/906,336

(22) Filed: Feb. 27, 2018

(65) Prior Publication Data

US 2019/0265997 A1    Aug. 29, 2019

(51) Int. Cl.
*G06F 9/455* (2018.01)
*G06N 10/00* (2019.01)

(52) U.S. Cl.
CPC ......... *G06F 9/45558* (2013.01); *G06N 10/00* (2019.01); *G06F 2009/4557* (2013.01)

(58) Field of Classification Search
CPC ........ G06F 9/45558; G06F 2009/4557; G06N 10/00
See application file for complete search history.

(56) References Cited

U.S. PATENT DOCUMENTS 6,879,948 B1    4/2005    Chalfin et al.
6,948,157 B2    9/2005    Larsson et al.
(Continued)

FOREIGN PATENT DOCUMENTS

CN    101383822    3/2009

OTHER PUBLICATIONS

Antonio García-Guirado, Ricardo Fernández-Pascual, and José M. García, "Virtual-GEMS: An Infrastructure to Simulate Virtual Machines," Proceedings of the 5th Annual Workshop on Modeling, Benchmarking, and Simulation (MoBS'09), 2009.
(Continued)

*Primary Examiner* — Adam Lee
(74) *Attorney, Agent, or Firm* — Bryan Cave Leighton Paisner LLP

(57) ABSTRACT

A method including receiving a registration request from each of two or more virtual machines. The method also can include registering the each of the two or more virtual machines as a registered virtual machine in response to receiving the registration request from the each of the two or more virtual machines. The method additionally can include sending a first start quantum message including a first time quantum to each of the registered virtual machines to cause each of the registered virtual machines to execute for the first time quantum in a first round. The method further can include, while a quantity of the registered virtual machines is at least a predetermined threshold amount, iteratively performing: receiving a completion indication from each of the registered virtual machines; and sending a subsequent start quantum message comprising the second time quantum to each of the registered virtual machines to cause each of the registered virtual machines to execute for the second time quantum in a subsequent round. Other embodiments of related systems and methods are disclosed.

22 Claims, 8 Drawing Sheets

(56) References Cited

U.S. PATENT DOCUMENTS

| | | | |
|---|---|---|---|
| 7,319,947 B1 | 1/2008 | Khaira et al. | |
| 7,475,002 B1* | 1/2009 | Mann | G06F 9/45558 703/21 |
| 7,684,971 B1 | 3/2010 | Larsson et al. | |
| 7,703,080 B2 | 4/2010 | Larsson et al. | |
| 7,849,450 B1 | 12/2010 | Rydh et al. | |
| 8,170,859 B1 | 5/2012 | Christensson et al. | |
| 8,276,127 B2 | 9/2012 | Rydh et al. | |
| 8,424,007 B1* | 4/2013 | Hernacki | G06F 9/485 718/103 |
| 8,621,179 B2 | 12/2013 | Werner et al. | |
| 9,003,405 B1* | 4/2015 | Hotra | G06F 9/45558 714/11 |
| 9,348,627 B1* | 5/2016 | Palekar | G06F 9/45533 |
| 9,524,389 B1* | 12/2016 | Roth | G06F 21/554 |
| 9,697,019 B1* | 7/2017 | Fitzgerald | G06F 9/45537 |
| 9,805,049 B1* | 10/2017 | Palekar | G06F 9/45558 |
| 2003/0028362 A1 | 2/2003 | Nagaki et al. | |
| 2005/0015754 A1 | 1/2005 | Werner et al. | |
| 2006/0064687 A1* | 3/2006 | Dostert | G06F 11/3409 718/1 |
| 2006/0143517 A1* | 6/2006 | Douceur | G06F 11/1484 714/21 |
| 2006/0259818 A1* | 11/2006 | Howell | G06F 11/1484 714/21 |
| 2006/0277546 A1* | 12/2006 | Rothman | G06F 9/45533 718/103 |
| 2009/0138877 A1* | 5/2009 | Fitzgerald | G06F 21/52 718/1 |
| 2011/0047315 A1* | 2/2011 | De Dinechin | G06F 1/14 711/6 |
| 2011/0072426 A1* | 3/2011 | Huang | G06F 9/544 718/1 |
| 2011/0167194 A1* | 7/2011 | Scales | G06F 11/1438 711/6 |
| 2011/0314470 A1* | 12/2011 | Elyashev | G06F 11/1484 718/1 |
| 2012/0117212 A1* | 5/2012 | Fries | G06F 8/61 709/223 |
| 2013/0218549 A1* | 8/2013 | Sultan | G06F 9/455 703/19 |
| 2013/0232493 A1* | 9/2013 | Kato | G06F 1/3228 718/1 |
| 2013/0318528 A1* | 11/2013 | Hirose | G06F 9/455 718/1 |
| 2014/0245069 A1* | 8/2014 | Hu | G06F 11/362 714/38.1 |
| 2014/0325508 A1* | 10/2014 | Kruglick | G06F 9/45533 718/1 |
| 2015/0134313 A1 | 5/2015 | Maturana et al. | |
| 2015/0220367 A1* | 8/2015 | Hotra | G06F 9/5038 718/1 |
| 2015/0378765 A1* | 12/2015 | Singh | G06F 9/45558 718/1 |
| 2015/0381430 A1* | 12/2015 | Deguchi | H04L 43/0876 709/224 |
| 2016/0048400 A1* | 2/2016 | Yang | H04L 67/34 718/1 |
| 2016/0112182 A1* | 4/2016 | Karnes | H04J 3/0697 375/362 |
| 2016/0234108 A1* | 8/2016 | McAleer | H04L 41/0853 |
| 2016/0239325 A1* | 8/2016 | Tsirkin | G06F 9/45558 |
| 2018/0270111 A1* | 9/2018 | Oohira | G06F 9/46 |
| 2019/0079896 A1* | 3/2019 | Srivastava | G06F 15/17331 |

OTHER PUBLICATIONS

Hiroyuki Tomiyama, "Simulation of Many-core NoCs with QEMU and SystemC," MPSoC'13, 13th International Forum on Embedded MPSoC and Multicore, Otsu, Japan, Jul. 15-19, 2013.

"Open-Source Routing and Network Simulation: How to emulate a network using VirtualBox," https://www.brianlinkletter.com/how-to-use-virtualbox-to-emulate-a-network/, Jul. 4, 2016.

Pavel Pisa, Jin Yang, and Michal Sojka, "QEMU CAN Controller Emulation with Connection to a Host System CAN Bus," 17th Real Time Linux Workshop, Graz, Austria, Oct. 21-22, 2015.

Ozgur Ozmen, James Nutaro, Jibonananda Sanyal, and Mohammed Olama, "Simulation-based Testing of Control Software," Oak Ridge National Laboratory, Oak Ridge, Tennessee, ORNL/TM-2017/45, Feb. 10, 2017.

Thomas Werthmann, Mirja Kühlewind, Matthias Kaschub, Sebastian Scholz, and David Wagner, "IKR SimLib-QEMU: TCP Simulations Integrating Virtual Machines," ICCRG-87, IETF Berlin, Jul. 31, 2013.

Alessandro Lonardi, and Graziano Pravadelli, "On the Co-simulation of SystemC with QEMU and OVP Virtual Platforms," L. Claesen et al. (Eds.): VLSI-SoC 2014, IFIP AICT 464, pp. 110-128, 2015.

Wind River, "Wind River Simics," https://www.windriver.com/products/simics/simics_po_0520.pdf, 2015.

Tse-ChenYeh and Ming-Chao Chiang, "On the interfacing between QEMU and SystemC for virtual platform construction: Using DMA as a case," Journal of Systems Architecture, vol. 58, Issues 3-4, pp. 99-111, Mar. 2012.

* cited by examiner

VIRTUAL COMMUNICATION ROUTER WITH TIME-QUANTUM SYNCHRONIZATION

TECHNICAL FIELD

This disclosure relates generally to virtual machines, and relates more particularly to virtual communications between virtual machines with time-quantum synchronization.

BACKGROUND

Hardware virtualization involves use a virtual machine to simulate a hardware system, such as to run simulations of object code developed to run on the hardware system. Such a virtual machine can allow for testing and debugging of the object code when the hardware is not available, such as when the hardware is not yet completed or is unavailable for other reasons. In various applications, multiple hardware systems communicate with each other over one or more data communication buses. For example, typical modern aircraft each include several different types of hardware systems, such as different line replaceable units (LRUs), which can perform various different functions and can communicate through one or more data buses. When performing virtual simulations of multiple hardware systems and the communications between the hardware systems, the virtual machines simulating the hardware systems can run at various speeds that are different from the real-time speeds of the actual hardware systems.

BRIEF DESCRIPTION OF THE DRAWINGS

To facilitate further description of the embodiments, the following drawings are provided in which.

Figure 1:
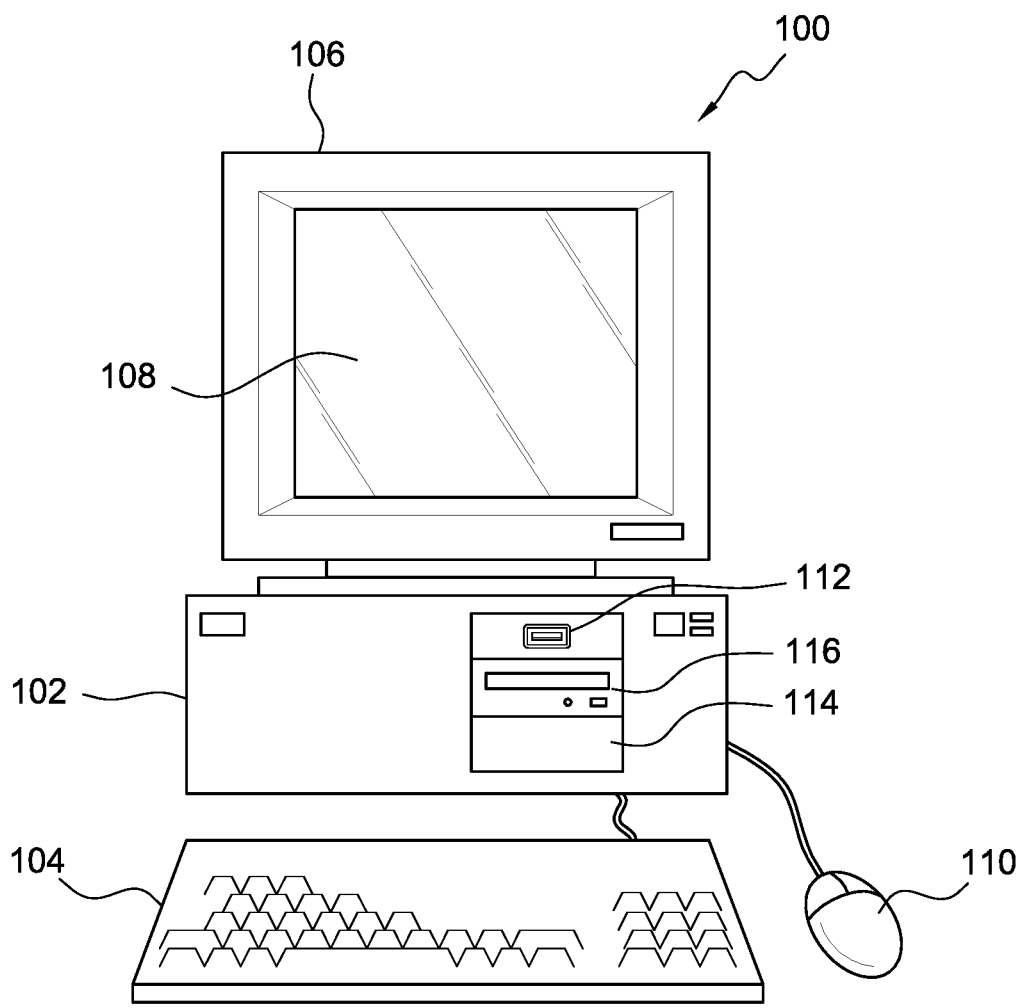
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "wall time" or "actual wall time" can refer to the actual, real-world time (e.g., the wall-clock time), "wall time duration" or "actual wall time duration" can refer to the actual amount of wall time that elapses during execution, "virtual time" can refer to the current time within a virtual machine, and "virtual wall time duration" can refer to the amount of virtual time elapsed in the execution, which can be the same as the actual wall time duration time that would have elapsed if the execution was performed on the actual hardware system being simulated by the virtual machine.

DESCRIPTION OF EXAMPLES OF EMBODIMENTS

Figure 2:
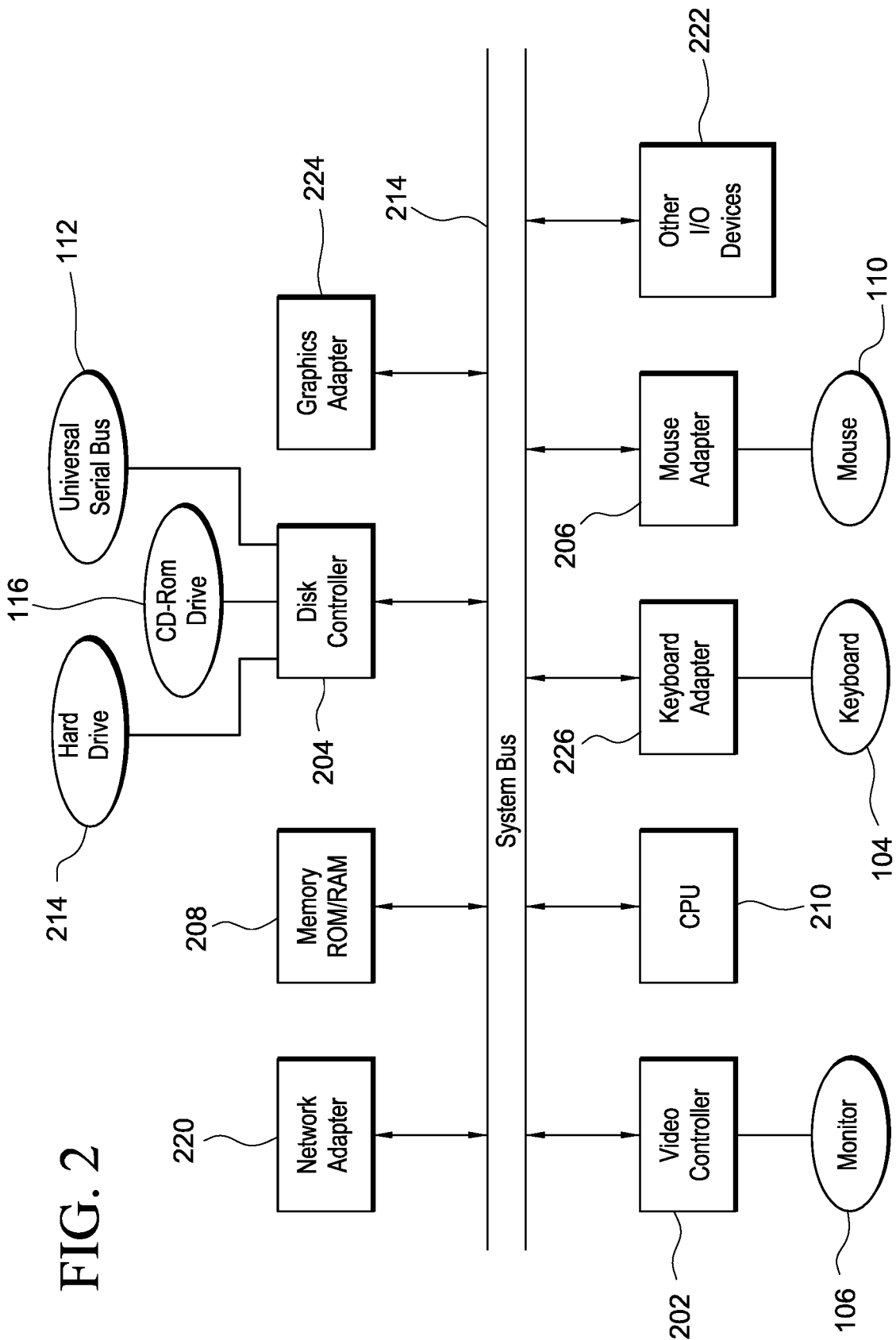
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
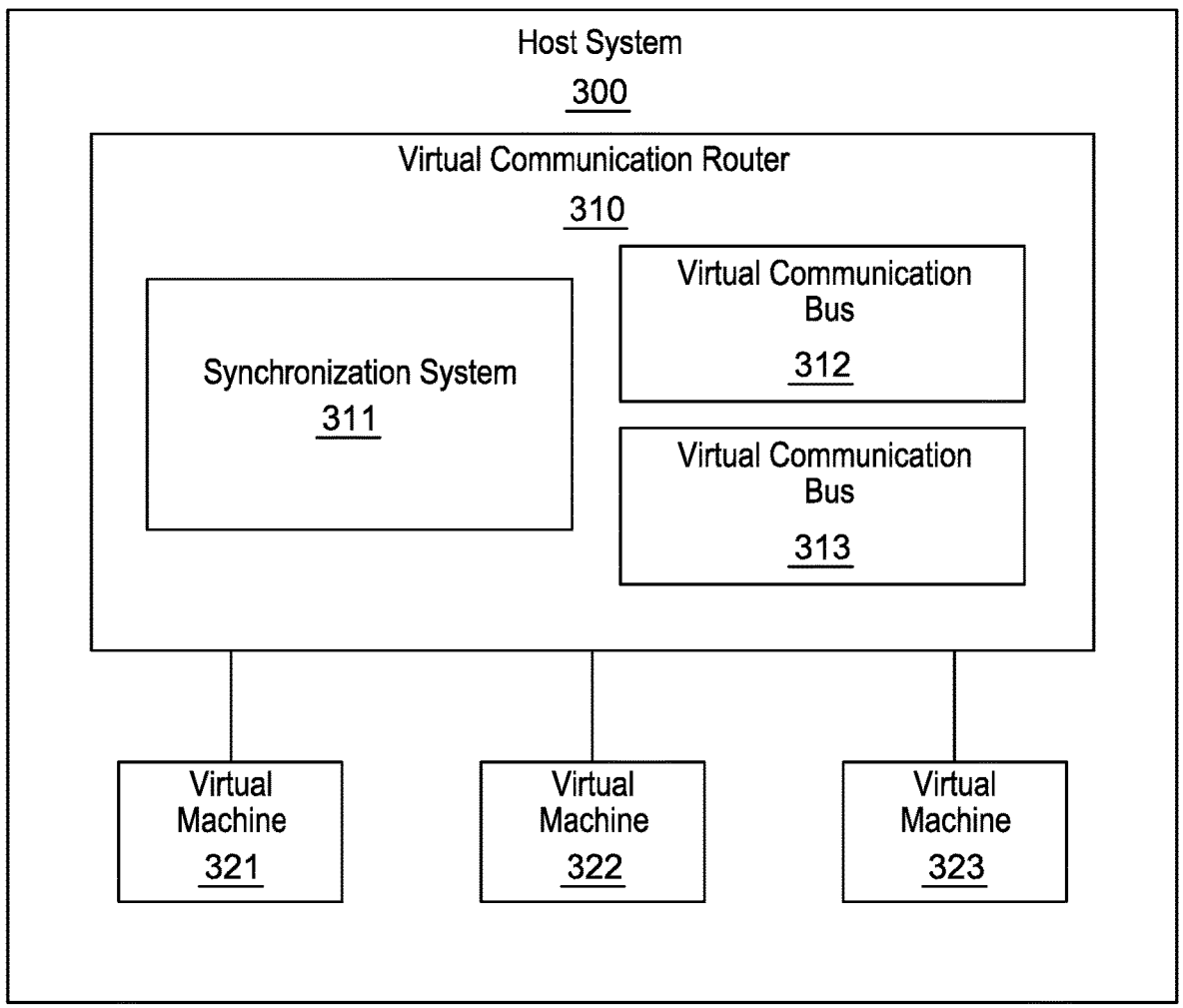
FIG. 3 illustrates a block diagram of a host system implementing a virtual communication router with time-quantum synchronization, according to an embodiment.

Turning ahead in the drawings, FIG. 3 illustrates a block diagram of a host system 300 implementing a virtual communication router 310 with time-quantum synchronization, according to an embodiment. Host system 300 is merely exemplary, and embodiments of the host system are not limited to the embodiments presented herein. The host system can be employed in many different embodiments or examples not specifically depicted or described herein. In some embodiments, certain elements, modules, or systems of host system 300 can perform various procedures, processes, and/or activities. In other embodiments, the procedures, processes, and/or activities can be performed by other suitable elements, modules, or systems of host system 300.

In some embodiments, host system 300 can include virtual communication router 310 and/or one or more virtual machines, such as virtual machines 321, 322, and/or 323. Generally, host system 300 can be implemented with hardware. Virtual communication router 310 and/or virtual machines 321-323 can be implemented in software operating on host system 300. In some embodiments, part or all of the hardware and/or software can be conventional, while in these or other embodiments, part or all of the hardware and/or software can be customized (e.g., optimized) for implementing part or all of the functionality of host system 300 described herein.

In many embodiments, virtual communication router 310 can include a synchronization system 311 and/or one or more virtual communication buses, such as virtual communication buses 312 and/or 313. In many embodiments, virtual communication router 310 and/or the virtual machines (e.g., 321-323) can operate as a virtual system on host system 300 to simulate a hardware system with multiple hardware system components that communicate with each other through hardware communication buses.

In a number of embodiments, host system 300 can be a single computer system or single server, such as computer system 100 (FIG. 1), as described above. In other embodiments, host system 300 can be more than one computer system, such as a collection or cluster of computer or servers, or a cloud of computers or servers. In some embodiments, for example, each of the virtual machines (e.g., 321-323) can run on a separate computer system, each called a separate host machine (not shown). In other embodiments, one of the virtual machines (e.g., 321) can run on a first host machine (not shown), and the other virtual machines (e.g., 322-323) can run on a second host machine (not shown). In various embodiments, the host machines can be part of host system 300. In some embodiments, virtual communication router 310 can run on the same host machine as the virtual machines (e.g., 321-323). In other embodiments, virtual communication router 310 can run on a computer system that is separate from the virtual machines (e.g., 321-323), but still part of host system 300.

In some embodiments, virtual communication router 310 can run in a distributed manner across multiple computer systems (not shown) that are part of host system 300. For example, virtual communication router 310 can reside on multiple server systems to scale out the virtual system operated on host system 300. In such cases, each instance of virtual communication router 310 operated on separate host machines can communicate directly to the other instances of virtual communication router 310, which can be configured to discover where each instance of virtual communication router 310 and/or each device (e.g., virtual machines 321-323) resides within the virtual system operated on the multiple host machines within host system 300.

In many embodiments, virtual communication router 310 can be in data communication with the virtual machines (e.g., 321-323). In various embodiments, each of the virtual machines (e.g., 321-323) can be a simulation or emulation of a hardware system. For example, the virtual machines (e.g., 321-323) can be run using a hypervisor or virtual machine monitor (VMM) that performs hardware virtualization, such as QEMU (Quick Emulator), VirtualBox by Oracle Corp., VMware, etc. In several embodiments, virtual communication router 310 also can be in data communication with external hardware systems (not shown) and/or test frameworks (not shown) external to host system 300, and these systems can be included in the simulations with time-quantum synchronization techniques described herein.

In several embodiments, the virtual communication buses (e.g., 312-313) of virtual communication router 310 can provide a generic message-based backend that can route any type of bus data to facilitate virtual communications between the virtual machines (e.g., 321-323) and/or the external hardware systems/test frameworks. In some embodiments, specific bus types can be derivatives of the generic buses. For example, bus-specific routing can be created within a specific bus type class. In several embodiments, virtual communication router 310 can provide methods that allow new bus types to be added as new communication protocols are developed and/or desired to be implemented in virtual communication router 310.

In many embodiments, the devices, such as the virtual machines (e.g., 321-323), external hardware, and/or test frameworks, can include multiple connections on many different buses, each of which can be configured within virtual communication router 310. For example, the connections can be configured within virtual communication router 310 to provide communication between the devices as bi-directional, point-to-point, one-to-many (multicast), or other suitable configurations. In many embodiments, virtual communication router 310 can keep track of the configured buses, e.g., virtual communication buses 312-313, and/or can monitor traffic on the buses to ensure that the data correctly goes from one device to the other device(s), based on the configured communications. In some embodiments, virtual bus traffic can be routed through Ethernet ports into virtual communication router 310. Virtual communication router 310 can then decide where the data packet should be sent based on the configuration of the buses (e.g., virtual communication buses 312-313) and the configured connections.

In several embodiments, the virtual system implemented on host system 300, which can include virtual communication router 310 and/or the virtual machines (e.g., 321-323), can simulate an actual system that includes several hardware systems. For example, an aircraft often includes many different hardware systems, such as LRUs, which each perform specific functions. These hardware systems generally communicate with each other through a communication bus, such as ARINC (Aeronautical Radio, Incorporated) Specification 664 Ethernet. The virtual system operated on host system 300 can simulate these hardware systems of the aircraft as virtual machines (e.g., 321-323), and can simulate the communications between the hardware systems on the communication bus using virtual communication router 310. In a number of embodiments, simulation of the hardware systems as virtual machines (e.g., 321-323) can be done using conventional hardware virtualization approaches, as modified to accommodate the techniques described herein. These virtual machines (e.g., 321-323) each can be used to test object code developed to run on a hardware system, and when integrated with virtual communication router 310 along with other virtual machines (e.g., 321-323), the virtual machines (e.g., 321-323) can be tested in a multi-system environment with communications between the individual systems.

As the actual hardware systems often communicate with each other, when performing simulations of multiple hardware system, simulating the communications between the hardware systems can be facilitate operating the virtual system in a way that simulates and tests the system of actual hardware and actual communication buses. In many embodiments, the virtual communication buses (e.g., 312-313) of virtual communication router 310 can handle the communication between the virtual machines (e.g., 321-323) to facilitate simulation of multiple hardware components in a virtual system, including the communications between the hardware components. In several embodiments, the communications through virtual communication router 310 can be handled as data messages that are routed accordingly to the configured connections between the devices (e.g., virtual machines 321-323).

The virtual machines (e.g., 321-323) simulating the hardware components often run at speeds that differ from the real-time speeds of the actual hardware systems that the virtual machines are simulating. For example, the object code instructions developed for the actual hardware are generally executed by the virtual machine as virtual instructions at an actual speed that is different from the speed at which the instructions would be run on the actual hardware. Although virtual machines (e.g., 321-323) often execute virtual instructions as fast as possible, the speed at which the virtual instructions execute on the virtual machine is often variable. Depending on the speed of the host machine, other processes running on the host machine, the complexity of the instructions, and/or the amount of communications performed, the speed of executing the virtual instructions can be faster or slower than what would be experienced by executing the instructions on the actual hardware that is simulated by the virtual machine. For example, if the actual hardware was a relatively slow machine performing few instructions, the virtual machine simulating the hardware system would most likely be able to simulate all instructions and the communications as if in real time, and possibly could execute more instructions than the actual hardware would be able to execute in a given amount of time. As another example, a virtual machine can run much slower at executing the virtual instructions than the actual hardware that executes those instructions. Either case poses a challenge to integrating the hardware systems, as the virtual time elapsed would be different between the virtualized hardware systems, which can result in communications being sent or received earlier or later than expected.

As an example, consider three virtual machines, VM1, VM2, and VM3, each simulating a different hardware system. In this example, the actual hardware system simulated by VM1 executes 100 instructions per 5 milliseconds (ms), the actual hardware system simulated by VM2 executes 100 instructions per 5 ms, and the actual hardware system simulated by VM3 executes 300 instructions per 5 ms. The number of virtual instructions executed for each 5 ms of wall time duration, in one example, is shown in Table 1 below. Although the actual hardware systems simulated by VM1 and VM2 both execute 100 instructions every 5 ms, Table 1 shows how the number of virtual instructions executed by VM1 and VM2 for each 5 ms of wall time duration can be different from 100 instructions, and can often be different between the virtual machines. Table 1 also shows how the number of instructions executed for each 5 ms of wall time duration is often variable for each virtual machine. These timing differences present a challenge when a first virtual machine (e.g., VM1) communicates with an second virtual machine (e.g., VM2 or VM3) at a specified rate, as the data will be received by the second virtual machine at a rate that is either faster or slower than the second virtual machine is designed to receive the data. With these timing differences, the simulation is not deterministic and not reproducible, and thus does not adequately simulate the actual time-sensitive communication buses and hardware components.

TABLE 1

| | Round | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Wall time duration (ms) | 5 | 5 | 5 | 5 | 5 | 5 | 5 | 5 | 5 | 5 | 5 | 5 | 5 |
| VM1 # of instructions | 100 | 120 | 80 | 200 | 110 | 100 | 100 | 120 | 120 | 110 | 105 | 101 | 110 |
| VM2 # of instructions | 110 | 105 | 110 | 110 | 105 | 110 | 105 | 110 | 105 | 110 | 110 | 105 | 110 |
| VM3 # of instructions | 300 | 110 | 280 | 110 | 300 | 280 | 300 | 100 | 300 | 100 | 100 | 100 | 100 |

In order to address these issues, in many embodiments, synchronization system 311 can issue a time quantum to each virtual machine (e.g., 321-323) in iterative rounds, such that each virtual machine will execute a constant virtual wall time duration each round. In other words, each virtual machine can execute for a virtual wall time duration that is predetermined. For example, because the actual hardware system simulated by VM1 executes 100 instructions per 5 ms, a virtual time duration of 5 ms on VM1 would result in execution of 100 instructions. The actual wall time duration to execute the 100 instructions on VM1 can be a different amount of time, such as 10 ms, due to VM1 running slower than the real-time speed of the hardware system simulated by VM11, for example. Table 2 below shows the number of instructions executed by the virtual machines, in one example, when the virtual wall time duration is set to 5 ms per round. The wall time duration for each of the virtual machines is the amount of actual time used to execute the instructions, which is a variable amount of time depending on how much time it takes the host machine to execute those operations. The wall time duration thus can be different from the virtual wall time duration of 5 ms, and in many cases, can be different for each virtual machine. Table 2 also illustrates, in each round, the longest wall time duration from among the wall time durations for the virtual machines.

In many embodiments, each virtual machine can be allotted the time quantum each round, and can run any amount of work for the virtual wall time duration specified by the time quantum. In the example in Table 2, for each of the virtual machines, that virtual machine executes the same number of instructions each round. In other virtual machines, however, the number of instructions executed each round can be variable, as the amount of work executed by the virtual machine during a virtual wall time duration can be determined by the specific virtual machine based its implementation details. Within a time quantum, in many embodiments, each virtual machine can run as fast as that virtual machine can operate, and the actual wall time at which each virtual machine completes can vary. The actual wall time duration of a round can be determined by when the last (i.e., slowest) of the virtual machines completes its work allotted by the time quantum for that round. In this manner, each of the virtual machines can be run in lockstep time slices of virtual time durations to accommodate the slowest machine.

In many embodiments, by providing a time quantum that allows each virtual machine to perform multiple (e.g., tens, hundreds, thousands, or more) instructions between each synchronization, the virtual simulation can proceed much

TABLE 2

| | Round | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Virtual wall time duration (ms) | 5 | 5 | 5 | 5 | 5 | 5 | 5 | 5 | 5 | 5 | 5 | 5 | 5 |
| VM1 # of instructions | 100 | 100 | 100 | 100 | 100 | 100 | 100 | 100 | 100 | 100 | 100 | 100 | 100 |
| VM2 # of instructions | 100 | 100 | 100 | 100 | 100 | 100 | 100 | 100 | 100 | 100 | 100 | 100 | 100 |
| VM3 # of instructions | 300 | 300 | 300 | 300 | 300 | 300 | 300 | 300 | 300 | 300 | 300 | 300 | 300 |
| Longest wall time duration (ms) | 5 | 15 | 10 | 5 | 10 | 15 | 5 | 30 | 15 | 5 | 10 | 5 | 10 |

In several embodiments, the time quantum representing a virtual wall time duration can be sent to each of the virtual machines during each round so that each of the virtual machines can execute that amount of virtual time for that round. Each virtual machine can take a variable amount of time, so the round can complete when all of the virtual machines have completed execution. By providing a time quantum representing a virtual wall time duration to each of the virtual machines, the simulation can proceed incrementally in blocks of time, which advantageously can synchronize the communications to provide a deterministic and reproducible execution of the virtual instructions. In many embodiments, the time quantum can be the same for each round, such as 5 ms, as shown in Table 2. In other embodiments, the time quantum can vary from round to round, based on preconfigured settings. In many embodiments, the time quantum can be configurable, and can be configured before running the simulation of the virtual system by a user who is running the simulation. In several embodiments, the time quantum can be set to any suitable virtual wall time duration. Whether the value chosen is suitable can be based on various factors, such as message rates, timing cycles of the communications, etc., in order to avoid communication timing skews.

faster than if the virtual machines (e.g., 321-323) were synchronized across virtual machines on each clock cycle.

In several embodiments, synchronization system 311 can coordinate the starting of the rounds. For example, synchronization system 311 can coordinate sending the time quantum to each of the virtual machines (e.g., 321-323). In some embodiments, synchronization system 311 can be responsible for registering each virtual machine (e.g., 321-323) and/or tracking whether or not each virtual machine has finished executing its work for the given time quantum. In many embodiments, synchronization system 311 can start before any of the virtual machines (e.g., 321-323). Each virtual machine (e.g., 321-323) that joins the virtual simulation and seeks synchronization can register itself with synchronization system 311, and then receive from synchronization system 311 a message to start the time quantum. The message to start the time quantum can include the time quantum, which can indicate a virtual wall time duration for execution. In some embodiments, the message to start the time quantum can include the virtual wall time for the virtual system. In several embodiments, synchronization system 311 can allow the virtual machine (e.g., 321-323) to execute its instructions for that given time quantum. In some embodiments, synchronization system 311 can then wait for each registered virtual machine (e.g., 321-323) to indicate to synchronization system 311 that the work for that time quantum is complete for each of the registered virtual machines. When all the registered virtual machines (e.g., 321-323) have signaled that they are complete with their work, synchronization system 311 can increment the virtual wall time by the value of the time quantum and send a message to all of the registered virtual machines (e.g., 321-323) to run their next time quantum worth of work. Synchronization system 311 again can wait for all of the registered virtual machines (e.g., 321-323) to send an indication that the quantum execution is completed in each of the registered virtual machines, and the process can be repeated.

Figure 4:
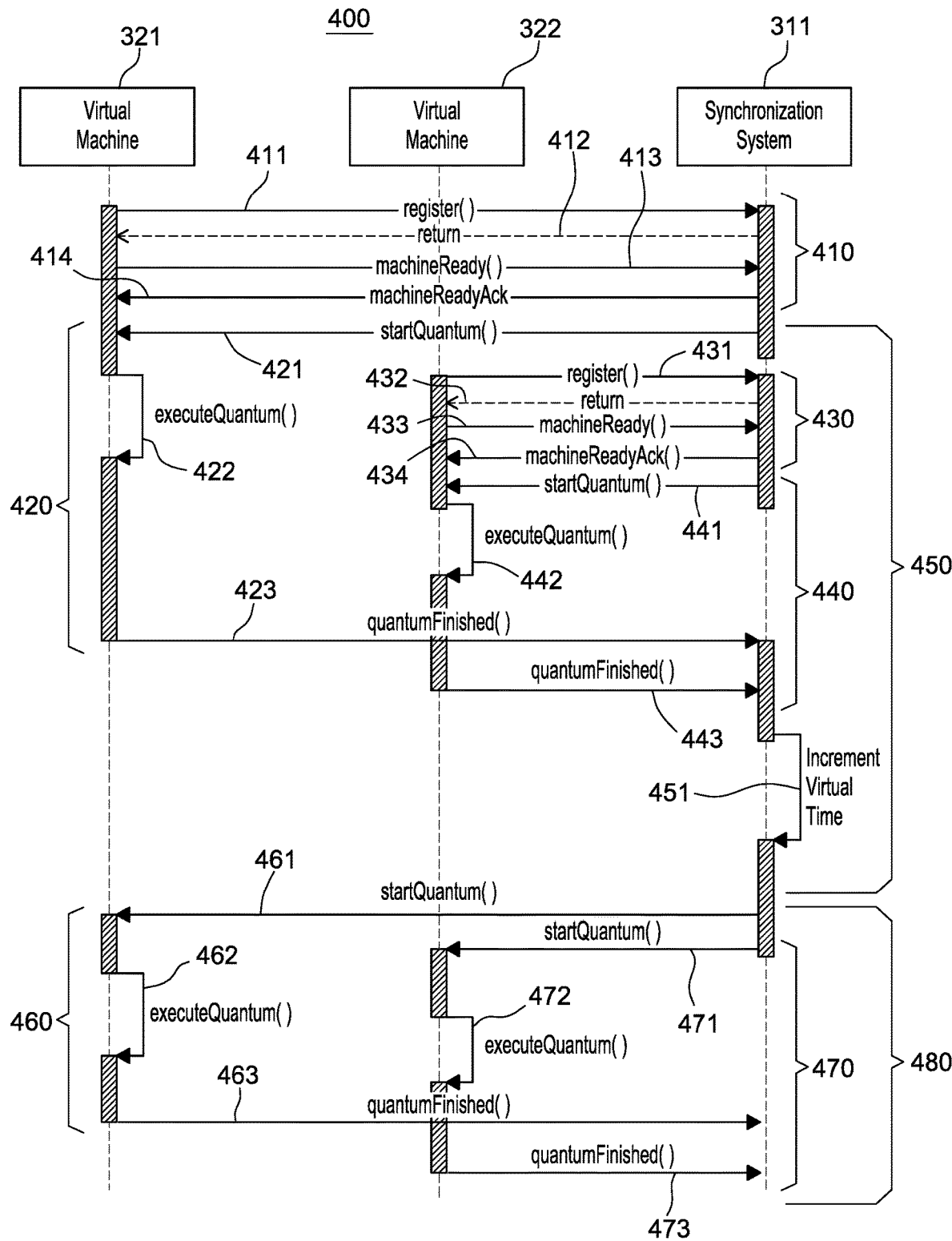
FIG. 4 illustrates a sequence diagram showing an example of a message exchange between the synchronization system of FIG. 3 and the virtual machines of FIG. 3, according to an embodiment.

Turning ahead in the drawings, FIG. 4 illustrates a sequence diagram 400 showing an example of a message exchange between synchronization system 311 and virtual machines 321-322, according to an embodiment. Sequence diagram 400 is merely exemplary, and embodiments of implementing time-quantum synchronization are not limited to the embodiments presented herein. Time-quantum synchronization can be employed in many different embodiments or examples not specifically depicted or described herein. In some embodiments, the procedures, the processes, and/or the activities of sequence diagram 400 can be performed in the order presented. In other embodiments, the procedures, the processes, and/or the activities of sequence diagram 400 can be performed in any suitable order. In still other embodiments, one or more of the procedures, the processes, and/or the activities of sequence diagram 400 can be combined or skipped.

In many embodiments, when a virtual machine seeks to participate in time-quantum synchronization, it first registers with synchronization system 311, as shown in sequences 410 and 430. Specifically, for example, sequence diagram 400 can include a sequence 410 of registering virtual machine 321. Sequence 410 can include a call 411 from virtual machine 321 to synchronization system 311 to register virtual machine 321 as a registered virtual machine. Upon receiving call 411, synchronization system 311 can register virtual machine 321 as a registered virtual machine in synchronization system 311, and can send a response 412 to virtual machine 321 to indicate that virtual machine 321 is successfully registered in synchronization system 311. Once virtual machine 321 is ready to execute instructions, virtual machine 321 can send a call 413 to synchronization system 311 indicating that virtual machine 321 is fully initialized and ready to start executing instructions. In response, synchronization system 311 can send an acknowledgement 414 to virtual machine 321, which can complete sequence 410.

In several embodiments, sequence diagram 400 can include a sequence 420 of executing a time quantum at virtual machine 321. In many embodiments, sequence 420 can begin after sequence 410 completes. Sequence 420 can include a call 421 from synchronization system 311 to virtual machine 321 that includes a start quantum message. The start quantum message can include the time quantum, which can indicate a virtual wall time duration for execution. In some embodiments, the start quantum message can include the virtual wall time for the virtual system. For example, the time quantum value can be included in the start quantum message. As another example, the time quantum value can be sent previously, such as in response 412 and/or acknowledgement 414, so that the virtual machine already knows the value of the time quantum when receiving the start quantum message. In response to receiving call 421, virtual machine 321 can perform an execution 422 for the virtual wall time duration specified by the time quantum. During execution 422, virtual machine 321 can perform any amount of work, as determined by virtual machine 321, but the amount of work performed is limited by the time quantum. Once execution 422 completes, virtual machine 321 can sent a completion indication 423 to synchronization system 311, which can complete sequence 420.

In some embodiments, depending on the number of registered virtual machines participating, and the implementation of synchronization system 311, a virtual machine can receive a start quantum message, such as the start quantum message in call 421, before receiving an acknowledgement, such as acknowledgement 414, but a virtual machine in this situation should not send a completion indication, such as completion indication 423, if the acknowledgement, such as acknowledgement 414, has not been received by the virtual machine. After the acknowledgement is received, the virtual machine can start to listen for the start quantum message, such as the start quantum message in call 421.

In many embodiments, as noted above, sequence diagram 400 also can include sequence 430 of registering virtual machine 322. Sequence 430 can include a call 431 from virtual machine 322 to synchronization system 311 to register virtual machine 322 as a registered virtual machine. Upon receiving call 431, synchronization system 311 can register virtual machine 322 as a registered virtual machine in synchronization system 311, and can send a response 432 to virtual machine 322 to indicate that virtual machine 322 is successfully registered in synchronization system 311. Once virtual machine 322 is ready to execute instructions, virtual machine 322 can send a call 433 to synchronization system 311 indicating that virtual machine 322 is fully initialized and ready to start executing instructions. In response, synchronization system 311 can send an acknowledgement 434 to virtual machine 322.

In some cases, sequence 430 can begin after sequence 410 begins, and in some cases, can begin after sequence 410 completes. In some cases, sequence 430 can begin after sequence 420 begins (as shown in FIG. 4). In some cases, sequence 430 can begin after sequence 420 completes. The timing of when sequence 430 begins relative to sequence 410 can be based on when virtual machines 321 and 322 are each ready to join the simulation.

In several embodiments, sequence diagram 400 can include a sequence 440 of executing a time quantum at virtual machine 322. In many embodiments, sequence 440 can begin after sequence 430 completes. Sequence 440 can include a call 441 from synchronization system 311 to virtual machine 322 that includes a start quantum message. The start quantum message can include the time quantum, which can indicate a virtual wall time duration for execution. The time quantum in call 441 can be the same as the time quantum in call 421. In some embodiments, the start quantum message can include the virtual wall time for the virtual system. The virtual wall time in call 441 can be the same as the virtual wall time in call 421. In response to receiving call 441, virtual machine 322 can perform an execution 442 for the virtual wall time duration specified by the time quantum. During execution 442, virtual machine 322 can perform any amount of work, as determined by virtual machine 322, but the amount of work performed is limited by the time quantum. Once execution 442 completes, virtual machine 322 can sent a completion indication 443 to synchronization system 311, which can complete sequence 440. In some cases, sequence 420 can complete before sequence 440 completes (as shown in FIG. 4). In other cases, sequence 440 can complete before sequence 420 completes, even if sequence 420 began before sequence 440 began. In many cases sequences 420 and 440 can proceed concurrently for at least part of the time, as shown in FIG. 4.

In many embodiments, sequence diagram 400 can include a sequence 450, which can include an initial round of execution of the time quantum in each of the registered machines. The initial round can begin when the first call with a start quantum message is sent from synchronization system 311, which is call 421 in the example shown in FIG. 4. The initial round can end when the last completion indication is received by synchronization system 311, which is completion indication 443 in the example shown in FIG. 4. The initial round can include sequence 420 of executing a time quantum at virtual machine 321 and sequence 440 of executing a time quantum at virtual machine 322. Generally, the initial round of execution can include executing the time quantum at each of the registered virtual machines, which can include one or more registered virtual machines, or in some embodiments, two or more registered virtual machines. In several embodiments, synchronization system 311 can perform an incrementing action 451, in which the virtual wall time for the virtual system can be incremented by the time quantum, as the virtual wall time duration of the time quantum has elapsed in the initial round of execution in sequence 450.

In many embodiments, sequence diagram can include a sequence 480, which can include a subsequent round of execution of the time quantum in each of the registered machines. In many embodiments, sequence 480 can begin after sequence 450 completes. Generally, the subsequent round of execution can include executing the time quantum at each of the registered virtual machines. For example, the subsequent round can include a sequence 460 of executing a time quantum at virtual machine 321 and sequence 470 of executing a time quantum at virtual machine 322. In several embodiments, synchronization system 311 can perform an incrementing action (not shown), similar to incrementing action 451, in which the virtual wall time for the virtual system can be incremented by the time quantum, as the virtual wall time duration of the time quantum has elapsed in the subsequent round of execution in sequence 480. In many embodiments, sequence 480 can repeat itself for as long as there are a sufficient number of registered virtual machines, which can be one or more in some embodiments, and two or more in other embodiments.

In several embodiments, sequence 460 can include a call 461 from synchronization system 311 to virtual machine 321 that includes a start quantum message. The start quantum message can include the time quantum, which can indicate a virtual wall time duration for execution. The time quantum in call 461 can be the same as the time quantum in call 421 and/or call 441. In some embodiments, the start quantum message can include the virtual wall time for the virtual system. In response to receiving call 461, virtual machine 321 can perform an execution 462 for the virtual wall time duration specified by the time quantum. During execution 462, virtual machine 321 can perform any amount of work, as determined by virtual machine 321, but the amount of work performed is limited by the time quantum. Once execution 462 completes, virtual machine 321 can sent a completion indication 463 to synchronization system 311, which can complete sequence 460.

In many embodiments, sequence 470 can include a call 471 from synchronization system 311 to virtual machine 322 that includes a start quantum message. The start quantum message can include the time quantum, which can indicate a virtual wall time duration for execution. The time quantum in call 471 can be the same as the time quantum in call 421, call 441, and/or call 461. In some embodiments, the start quantum message can include the virtual wall time for the virtual system. The virtual wall time in call 471 can be the same as the virtual wall time in call 461. In response to receiving call 471, virtual machine 322 can perform an execution 472 for the virtual wall time duration specified by the time quantum. During execution 472, virtual machine 322 can perform any amount of work, as determined by virtual machine 322, but the amount of work performed is limited by the time quantum. Once execution 472 completes, virtual machine 322 can sent a completion indication 473 to synchronization system 311, which can complete sequence 470. In some cases, sequence 460 can complete before sequence 470 completes (as shown in FIG. 4). In other cases, sequence 470 can complete before sequence 460 completes, even if sequence 460 began before sequence 470 began. In many cases sequences 460 and 470 can proceed concurrently for at least part of the time, as shown in FIG. 4.

In many embodiments, under this technique, the virtual machines (e.g., 321-322) can halt execution when the time quantum is expired and the completion indication is sent, and not resume execution until the virtual machine receives a subsequent start quantum message. In other words, each of the virtual machines (e.g., 321-322) can fully pause while waiting to be released for its next time quantum of work. in several embodiments, the virtual wall time can be sent to the virtual machines (e.g., 321-322) from synchronization system 311, and the virtual machines do not calculate the virtual wall time through another manner, such as by using the time of the host machine that is running the virtual machine. Because each virtual machine proceeds at the same time quantum, the virtual wall time can be the same in each virtual machine.

The message exchange shown in FIG. 4 is merely exemplary. In other examples, additional virtual machines can be added to the time-quantum synchronization, such as during a subsequent round, and/or registered virtual machines can be unregistered or dropped. In a number of embodiments, synchronization system 311, can track statistics for each registered virtual machine. For example, synchronization system 311 can track the actual wall time durations for each of the virtual machines between sending the start quantum message and receiving the completion indication. In some embodiments, the actual wall time durations can be averaged, and this average can be used to determine if a virtual machine has become non-responsive. For example, if a completion indication has not been received from a virtual machine after more than a predetermined multiplier of the average response time duration from the time when the start quantum message was sent (when measured by the actual wall time), synchronization system 311 can determine that a time-out condition has occurred. The predetermined multiplier can be two, three, four, five, six, seven, ten, or another suitable multiplier. When the time-out condition is detected, the non-responsive virtual machine can be removed from the list of registered virtual machines, and a machine dropped message can be sent to the virtual machine to indicate to the virtual machine, if it is still alive, that it has been removed, and/or to notify other virtual machines that the virtual machine has been dropped.

In some embodiments, synchronization system 311 can use a multiplier of the average response time duration when there are three or more registered virtual machines. In such embodiments, when there are fewer than three registered virtual machines, a predetermined time duration can be used to determine that a virtual machine has become non-responsive. For example, a hard deadline of 3 seconds (s), 4 s, 5 s, 6 s, 10 s, or another suitable value, can be used to determine that the virtual machine has stopped participating if the completion indication has not been received in that amount of actual wall time after sending the start quantum message. In many embodiments, by removing a registered virtual machine that requests to be unsubscribed or that has become unresponsive, the simulation can continue even if part of the virtual system has gone down or been removed.

In a number of embodiments, the simulation of the entire system can be paused in a straightforward manner to halt execution of all of the virtual machines. For example, after receiving the completion indications, synchronization system 311 can hold off on sending a subsequent start quantum message. The simulation thus can be paused for as long as desired, then restarted by sending a subsequent start quantum message.

Figure 8:
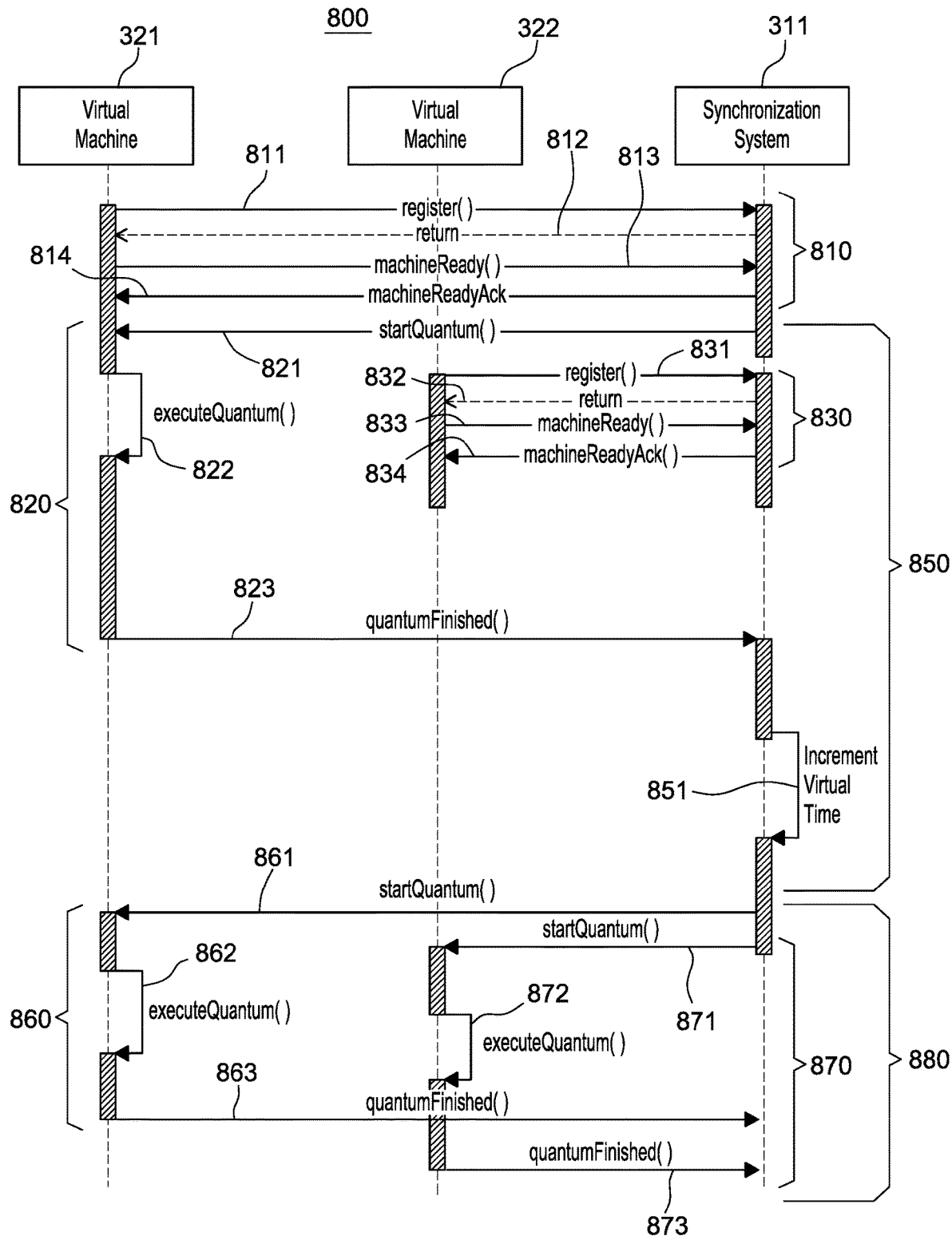
FIG. 8 illustrates a sequence diagram showing an example of a message exchange between the synchronization system of FIG. 3 and the virtual machines of FIG. 3, according to another embodiment.

Jumping ahead in the drawings, FIG. 8 illustrates a sequence diagram 800 showing an example of a message exchange between synchronization system 311 and virtual machines 321-322, according to another embodiment. Sequence diagram 800 is merely exemplary, and embodiments of implementing time-quantum synchronization are not limited to the embodiments presented herein. Time-quantum synchronization can be employed in many different embodiments or examples not specifically depicted or described herein. In some embodiments, the procedures, the processes, and/or the activities of sequence diagram 800 can be performed in the order presented. In other embodiments, the procedures, the processes, and/or the activities of sequence diagram 800 can be performed in any suitable order. In still other embodiments, one or more of the procedures, the processes, and/or the activities of sequence diagram 800 can be combined or skipped.

In many embodiments, sequence diagram 800 can be similar to sequence diagram 400 (FIG. 4), and various procedures, processes, and/or activities of sequence diagram 800 can be similar or identical to various procedures, processes, and/or activities of sequence diagram 400 (FIG. 4). In several embodiments, sequence diagram 800 can differ from sequence diagram 400 (FIG. 4) in that when a machine registers after a round of execution has begun, the start quantum message is sent to the new machine on the subsequent round of execution instead of during the round of execution during which the new machine was added.

In many embodiments, when a virtual machine seeks to participate in time-quantum synchronization, it first registers with synchronization system 311, as shown in sequences 810 and 830. Sequences 810 and/or 830 can be similar or identical to sequences 410 (FIG. 4) and/or 430 (FIG. 4). Specifically, for example, sequence diagram 800 can include a sequence 810 of registering virtual machine 321. Sequence 810 can include a call 811 from virtual machine 321 to synchronization system 311 to register virtual machine 321 as a registered virtual machine. Upon receiving call 811, synchronization system 311 can register virtual machine 321 as a registered virtual machine in synchronization system 311, and can send a response 812 to virtual machine 321 to indicate that virtual machine 321 is successfully registered in synchronization system 311. Once virtual machine 321 is ready to execute instructions, virtual machine 321 can send a call 813 to synchronization system 311 indicating that virtual machine 321 is fully initialized and ready to start executing instructions. In response, synchronization system 311 can send an acknowledgement 814 to virtual machine 321, which can complete sequence 810.

In several embodiments, sequence diagram 800 can include a sequence 820 of executing a time quantum at virtual machine 321. Sequence 820 can be similar or identical to sequence 420 (FIG. 4). In many embodiments, sequence 820 can begin after sequence 810 completes. Sequence 820 can include a call 821 from synchronization system 311 to virtual machine 321 that includes a start quantum message. The start quantum message can include the time quantum, which can indicate a virtual wall time duration for execution. In some embodiments, the start quantum message can include the virtual wall time for the virtual system. For example, the time quantum value can be included in the start quantum message. As another example, the time quantum value can be sent previously, such as in response 812 and/or acknowledgement 814, so that the virtual machine already knows the value of the time quantum when receiving the start quantum message. In response to receiving call 821, virtual machine 321 can perform an execution 822 for the virtual wall time duration specified by the time quantum. During execution 822, virtual machine 321 can perform any amount of work, as determined by virtual machine 321, but the amount of work performed is limited by the time quantum. Once execution 822 completes, virtual machine 321 can sent a completion indication 823 to synchronization system 311, which can complete sequence 820.

In some embodiments, depending on the number of registered virtual machines participating, and the implementation of synchronization system 311, a virtual machine can receive a start quantum message, such as the start quantum message in call 821, before receiving an acknowledgement, such as acknowledgement 814, but a virtual machine in this situation should not send a completion indication, such as completion indication 823, if the acknowledgement, such as acknowledgement 814, has not been received by the virtual machine. After the acknowledgement is received, the virtual machine can start to listen for the start quantum message, such as the start quantum message in call 821.

In many embodiments, as noted above, sequence diagram 800 also can include sequence 830 of registering virtual machine 322. Sequence 830 can include a call 831 from virtual machine 322 to synchronization system 311 to register virtual machine 322 as a registered virtual machine. Upon receiving call 831, synchronization system 311 can register virtual machine 322 as a registered virtual machine in synchronization system 311, and can send a response 832 to virtual machine 322 to indicate that virtual machine 322 is successfully registered in synchronization system 311. Once virtual machine 322 is ready to execute instructions, virtual machine 322 can send a call 833 to synchronization system 311 indicating that virtual machine 322 is fully initialized and ready to start executing instructions. In response, synchronization system 311 can send an acknowledgement 834 to virtual machine 322.

In some cases, sequence 830 can begin after sequence 810 begins, and in some cases, can begin after sequence 810 completes. In some cases, sequence 830 can begin after sequence 820 begins (as shown in FIG. 8). In many cases, sequence 830 can begin after sequence 820 completes. The timing of when sequence 830 begins relative to sequence 810 can be based on when virtual machines 321 and 322 are each ready to join the simulation. In many embodiments, if sequence 830 ends after sequence 820 has begun, such as shown in FIG. 8, and/or after a sequence of executing a time quantum has begun at any of the virtual machines, a sequence of executing a time quantum for virtual machines 322 as a newly registered machine will not occur until a subsequent round of execution, instead of a sequence of execution, such as sequence 440 (FIG. 4) of executing a time quantum at virtual machine 322, being performed during the same initial round of execution of sequence 820.

In many embodiments, sequence diagram 800 can include a sequence 850, which can include an initial round of execution of the time quantum in virtual machine 321. The initial round can begin when the call with a start quantum message is sent from synchronization system 311 to virtual machine 321, which is call 821 in the example shown in FIG. 8. The initial round can end when the completion indication is received by synchronization system 311 from virtual machines 321, which is completion indication 823 in the example shown in FIG. 8. The initial round can include sequence 820 of executing a time quantum at virtual machine 321. The initial round of execution in this case can include executing the time quantum at a single virtual machine. In several embodiments, synchronization system 311 can perform an incrementing action 851, in which the virtual wall time for the virtual system can be incremented by the time quantum, as the virtual wall time duration of the time quantum has elapsed in the initial round of execution in sequence 850.

In many embodiments, sequence diagram can include a sequence 880, which can include a round of execution of the time quantum in each of the registered machines. In the case shown in sequence diagram 800, sequence 880 is the first round of execution that includes two or more registered machines performing execution, as sequence 850 only included virtual machine 321 performing execution. In many embodiments, sequence 880 can begin after sequence 850 completes. Generally, the round of execution shown in sequence 880 can include executing the time quantum at each of the registered virtual machines. For example, the round can include a sequence 860 of executing a time quantum at virtual machine 321 and sequence 870 of executing a time quantum at virtual machine 322. In several embodiments, synchronization system 311 can perform an incrementing action (not shown), similar to incrementing action 851, in which the virtual wall time for the virtual system can be incremented by the time quantum, as the virtual wall time duration of the time quantum has elapsed in the round of execution in sequence 880. In many embodiments, sequence 880 can repeat itself for as long as there are a sufficient number of registered virtual machines, which can be one or more in some embodiments, and two or more in other embodiments.

In several embodiments, sequence 860 can include a call 861 from synchronization system 311 to virtual machine 321 that includes a start quantum message. The start quantum message can include the time quantum, which can indicate a virtual wall time duration for execution. The time quantum in call 861 can be the same as the time quantum in call 821. In some embodiments, the start quantum message can include the virtual wall time for the virtual system. In response to receiving call 861, virtual machine 321 can perform an execution 862 for the virtual wall time duration specified by the time quantum. During execution 862, virtual machine 321 can perform any amount of work, as determined by virtual machine 321, but the amount of work performed is limited by the time quantum. Once execution 862 completes, virtual machine 321 can sent a completion indication 863 to synchronization system 311, which can complete sequence 860.

In many embodiments, sequence 870 can include a call 871 from synchronization system 311 to virtual machine 322 that includes a start quantum message. The start quantum message can include the time quantum, which can indicate a virtual wall time duration for execution. The time quantum in call 871 can be the same as the time quantum in call 821 and/or call 861. In some embodiments, the start quantum message can include the virtual wall time for the virtual system. The virtual wall time in call 871 can be the same as the virtual wall time in call 861. In response to receiving call 871, virtual machine 322 can perform an execution 872 for the virtual wall time duration specified by the time quantum. During execution 872, virtual machine 322 can perform any amount of work, as determined by virtual machine 322, but the amount of work performed is limited by the time quantum. Once execution 872 completes, virtual machine 322 can sent a completion indication 873 to synchronization system 311, which can complete sequence 870. In some cases, sequence 860 can complete before sequence 870 completes (as shown in FIG. 8). In other cases, sequence 870 can complete before sequence 860 completes, even if sequence 860 began before sequence 870 began. In many cases sequences 860 and 870 can proceed concurrently for at least part of the time, as shown in FIG. 8.

In many embodiments, under this technique, the virtual machines (e.g., 321-322) can halt execution when the time quantum is expired and the completion indication is sent, and not resume execution until the virtual machine receives a subsequent start quantum message. In other words, each of the virtual machines (e.g., 321-322) can fully pause while waiting to be released for its next time quantum of work. in several embodiments, the virtual wall time can be sent to the virtual machines (e.g., 321-322) from synchronization system 311, and the virtual machines do not calculate the virtual wall time through another manner, such as by using the time of the host machine that is running the virtual machine. Because each virtual machine proceeds at the same time quantum, the virtual wall time can be the same in each virtual machine.

Figure 5:
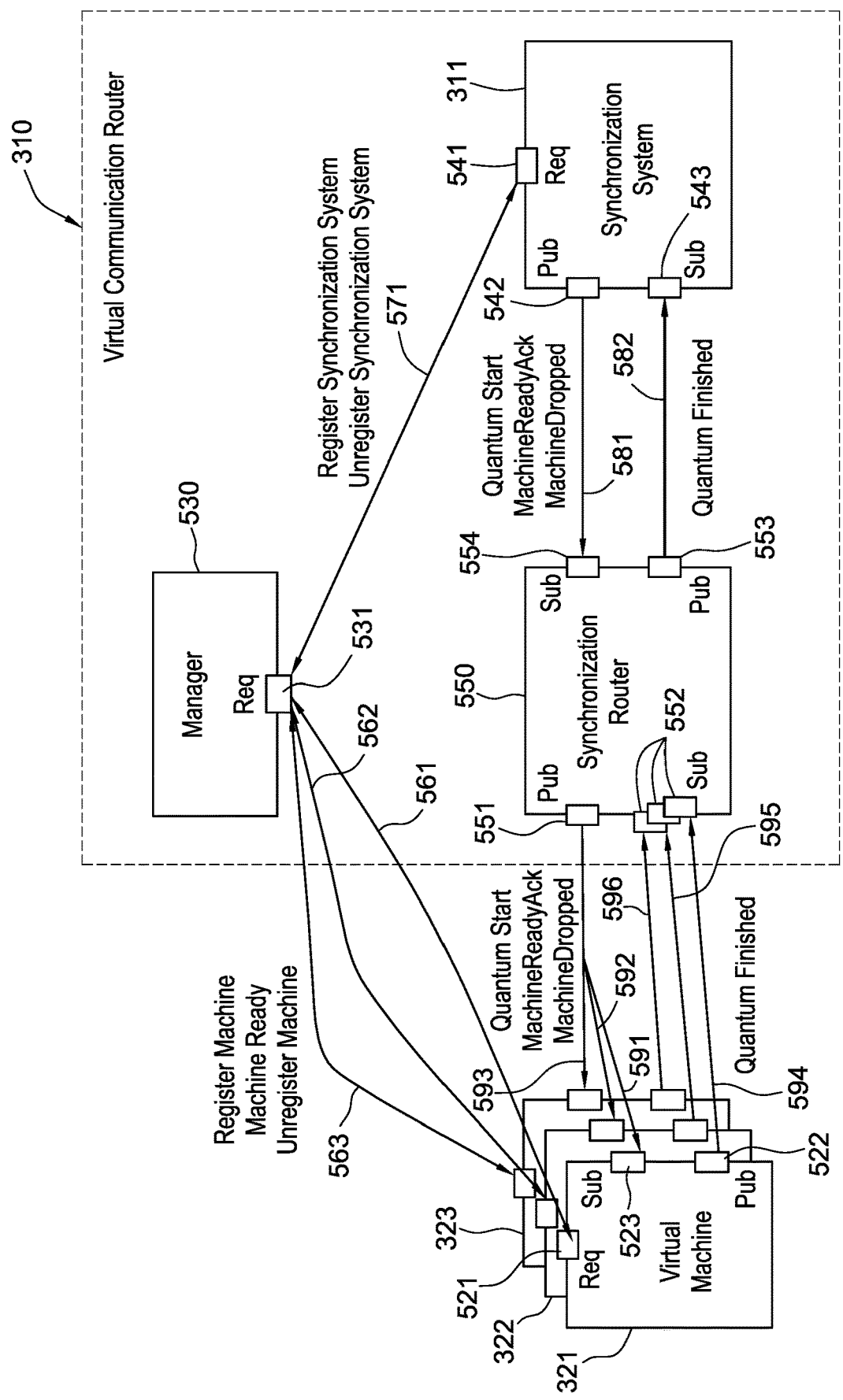
FIG. 5 illustrates a block diagram of a virtual system implementing the virtual communication router of FIG. 3 with time-quantum synchronization, and showing a message flow between components of virtual system, according to an embodiment.

Turning back in the drawings, FIG. 5 illustrates a block diagram of a virtual system 500 implementing virtual communication router 310 with time-quantum synchronization, and showing a message flow between components of virtual system 500, according to an embodiment. Virtual system 500 is merely exemplary, and embodiments of the virtual system are not limited to the embodiments presented herein. The virtual system can be employed in many different embodiments or examples not specifically depicted or described herein. In some embodiments, certain elements, modules, or systems of virtual system 500 can perform various procedures, processes, and/or activities. In other embodiments, the procedures, processes, and/or activities can be performed by other suitable elements, modules, or systems of virtual system 500. In some embodiments, the procedures, the processes, and/or the activities of shown in FIG. 5 can be performed in the order presented. In other embodiments, the procedures, the processes, and/or the activities shown in FIG. 5 can be performed in any suitable order. In still other embodiments, one or more of the procedures, the processes, and/or the activities shown in FIG. 5 can be combined or skipped. In many embodiments, virtual system 500 can be implemented on host system 300 (FIG. 3). In some embodiments, virtual system 500 can show an exemplary implementation of virtual communication router 310 and synchronization system 311, in communication with virtual machines 321-323.

In some embodiments, virtual system 500 can include virtual machines 321-323, and/or can include virtual communication router 310. In many embodiments, synchronization system 311 can be a part of virtual communication router 310. In other embodiments, synchronization system 311 can be implemented outside virtual communication router 310 (not shown). In many embodiments, virtual communication router 310 can include a manager 530 and/or a synchronization router 550. In several embodiments, manager 530 can include a request port 531. In a number of embodiments, synchronization system 311 can include a request port 541, a publish port 542, and/or a subscribe port 543. In various embodiments, synchronization router 550 can include an external publish port 551, external subscribe ports 552, an internal publish port 553, and/or an internal subscribe port 554. In several embodiments, each of the virtual machines (e.g., 321-323) can include a request port, such as request port 521 on virtual machine 321, a publish port, such as publish port 522 on virtual machine 321, and/or a subscribe port, such as subscribe port 523 on virtual machine 321.

In many embodiments, synchronization router 550 can be similar or identical to virtual communication buses 312 and/or 313, and can be used to facilitate communications with synchronization system 311. In several embodiments, synchronization router 550 can deliver the start quantum messages, such as in calls 421 (FIG. 4), 441 (FIG. 4), 461 (FIG. 4), 471 (FIG. 4), 821 (FIG. 8), 861 (FIG. 8), and/or 871 (FIG. 8) and the completion indication (quantum finished) messages, such as completion messages 423 (FIG. 4), 443 (FIG. 4), 463 (FIG. 4), 473 (FIG. 4), 823 (FIG. 8), 863 (FIG. 8), and/or 873 (FIG. 8), to the appropriate endpoints, and this design beneficially can facilitate implementation of synchronization system 311 outside of virtual communication router 310. In many embodiments, synchronization system 311 can register and/or unregister itself with manager 530 in a message path 571. In several embodiments, each of the virtual machines 321, 322, and 323 can communicate with manager 530 in a message path 561, 562, and 563, respectively. For example, virtual machine 321 can communicate with manager 530 in message path 561 to register virtual machine 321 with manager 530, to unregister virtual machine 321 with manager 530, and/or to indicate to manager 530 that virtual machine 321 is ready to start execution. In a number of embodiments, when manager 530 receives the register message to register a virtual machine, such as in calls 411 (FIG. 4), 431 (FIG. 4), 811 (FIG. 8), and/or 831 (FIG. 8), manager 530 can respond to the virtual machine with communication information, such as information (e.g., connection strings) for transmit and/or receive paths to facilitate future communications, and/or the value of the time quantum, so that the virtual machine can know the value of time quantum being used. In many embodiments, when manager 530 receives the register message to register a virtual machine, manager 530 can send a machine added message to synchronization system 311 to inform synchronization system 311 that a new virtual machine has been registered.

In many embodiments, the virtual machines (e.g., 321-323), synchronization system 311, and/or synchronization router 550 can use PUB/SUB (publish/subscribe) ports for transmission and receipt of messages in a PUB/SUB message model. Under the PUB/SUB message model, any device that has subscribed to a publish port on a sending device will receive the messages sent from the publish port, and these messages will be received through a subscribe port on the device. Accordingly, all virtual machines that have registered will receive, through their subscribe ports (e.g., subscribe port 523 of virtual machine 321) any messages sent from the publish port (e.g., 551) of synchronization router 550, including messages that apply to only one of the virtual machines (e.g., an acknowledgement that the virtual machine is ready and/or a message that the virtual machine has been dropped). In many embodiments, the messages that are intended for a single virtual machine can include an identifier for that machine, such that each of the virtual machines (e.g., 321-323) can determine the intended recipient of the message. The virtual machine that determines that it is the intended recipient of the message can process the message.

In several embodiments, synchronization system 311 can use publish port 542 to send messages through message path 581 to internal subscribe port 534 of synchronization router 550. The messages sent through message path 581 can include the start quantum messages (e.g., calls 421 (FIG. 4), 441 (FIG. 4), 461 (FIG. 4), 471 (FIG. 4), 821 (FIG. 8), 861 (FIG. 8), and/or 871 (FIG. 8)), the acknowledgments that the virtual machine is ready (e.g., acknowledgements 414 (FIG. 4), 434 (FIG. 4), 814 (FIG. 8), and/or 834 (FIG. 8)), and/or the messages indicating that the virtual machine has been dropped.

In a number of embodiments, synchronization router 550 can use external publish port 551 to send messages through message paths 591, 592, and 593 to the subscribe ports (e.g., subscribe port 523 of virtual machine 321) of virtual machines 321, 322, and 323, respectively. The messages sent through message paths 591-593 can include the start quantum messages (e.g., calls 421 (FIG. 4), 441 (FIG. 4), 461 (FIG. 4), 471 (FIG. 4), 821 (FIG. 8), 861 (FIG. 8), and/or 871 (FIG. 8)), the acknowledgments that the virtual machine is ready (e.g., acknowledgements 414 (FIG. 4), 434 (FIG. 4), 814 (FIG. 8), and/or 834 (FIG. 8)), and/or the messages indicating that the virtual machine has been dropped, such as forwarding those messages synchronization router 550 receives from synchronization system 311.

In a many embodiments, virtual machines 321, 322, and 323 can use the publish port (e.g., publishe port 522 of virtual machine 321) of the virtual machine to send messages through message paths 594, 595, and 596, respectively to external subscribe ports 552 of synchronization router 550. The messages sent through message paths 594-596 can include the completion indication (quantum finished) messages (e.g., completion indications 423 (FIG. 4), 443 (FIG. 4), 463 (FIG. 4), 473 (FIG. 4), 823 (FIG. 8), 863 (FIG. 8), and/or 873 (FIG. 8)).

In several embodiments, synchronization router 550 can use internal publish port 553 to send messages through message path 582 to subscribe port 543 of synchronization system 311. The messages sent through message path 582 can include the completion indication (quantum finished) messages (e.g., completion indications 423 (FIG. 4), 443 (FIG. 4), 463 (FIG. 4), 473 (FIG. 4), 823 (FIG. 8), 863 (FIG. 8), and/or 873 (FIG. 8)).), such as forwarding those messages synchronization router 550 receives from synchronization system 311.

Figure 6:
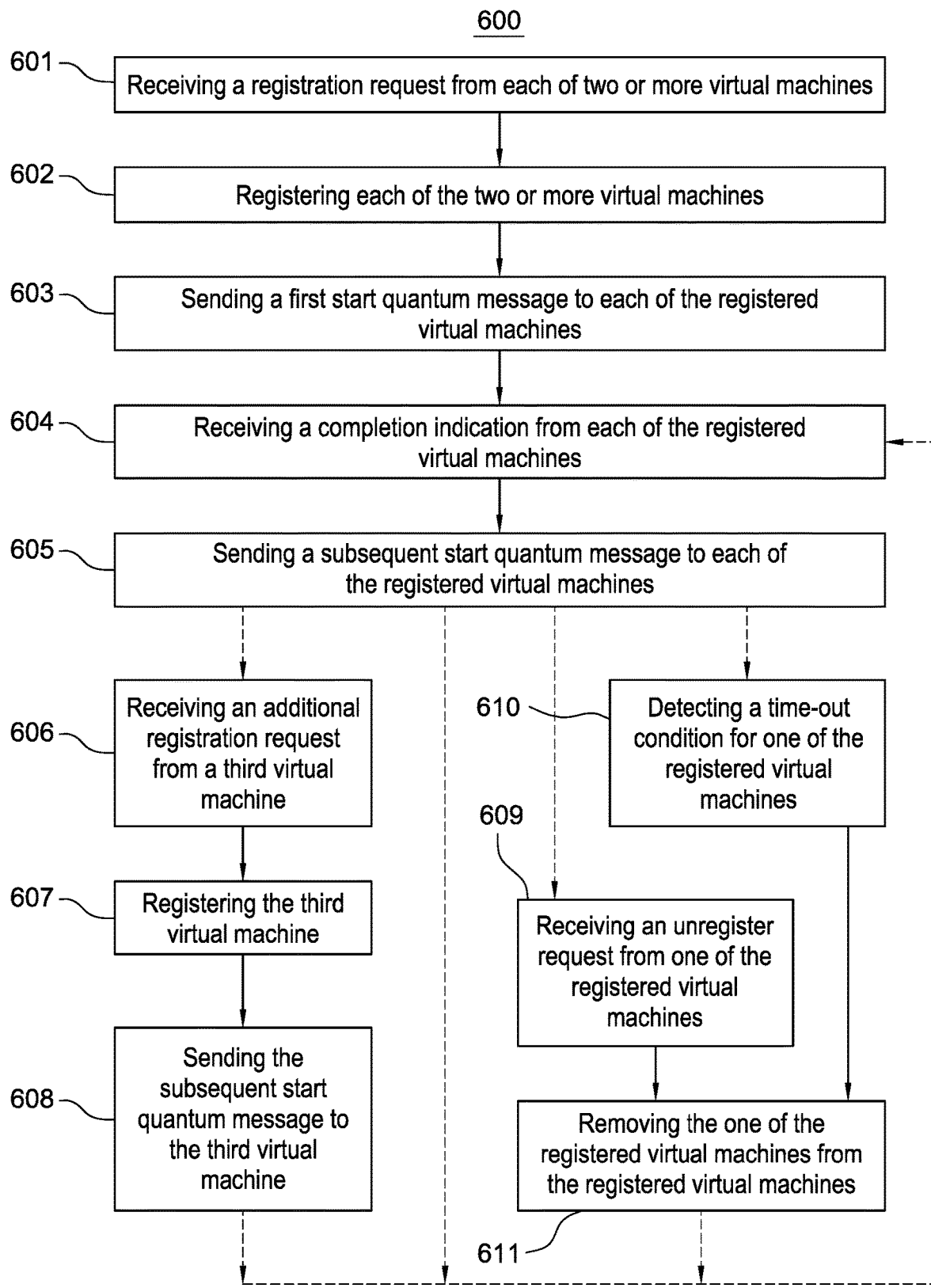
FIG. 6 illustrates a flow chart for a method, according to an embodiments.

Turning ahead in the drawings, FIG. 6 illustrates a flow chart for a method 600. In some embodiments, method 600 can be a method of implementing time-quantum synchronization. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, synchronization system 311 (FIG. 3), virtual communication router 310 (FIG. 3), and/or host system 300 can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of a computer system such as host system 300 (FIG. 3). The processor(s) can be similar or identical to the processor(s) described above with respect to computer system 100 (FIG. 1).

In some embodiments, method 600 and other blocks in method 600 can include using a distributed network including distributed memory architecture to perform the associated activity. This distributed architecture can reduce the impact on the network and system resources to reduce congestion in bottlenecks while still allowing data to be accessible from a central location.

Referring to FIG. 6, method 600 can include a block 601 of receiving a registration request from each of two or more virtual machines. The registration request can be similar or identical to call 411 (FIG. 4), call 431 (FIG. 4), call 811 (FIG. 8), and/or call 831 (FIG. 8). The virtual machines can be similar or identical to virtual machines 321-323 (FIG. 3). In some embodiments, the virtual machines can execute on a single host machine. In other embodiments, at least some of the virtual machines can execute on a host machine that is separate from the host machine on which other of the virtual machines execute. For example, a first one of the registered virtual machines can execute on a first host machine, a second one of the registered virtual machines can execute on a second host machine, and the first host machine can be different from the second host machine.

In several embodiments, method 600 also can include a block 602 of registering the each of the two or more virtual machines as a registered virtual machine in response to receiving the registration request from the each of the two or more virtual machines. In some embodiments, a first one of the two or more virtual machines can be registered as the a first one of the registered virtual machines before registering a second one of the two or more virtual machines as a second one of the registered virtual machines. In a number of embodiments, a list of the registered virtual machines can be maintained, which can be updated when virtual machines are registered or unregistered, as described below in further detail.

In a number of embodiments, method 600 additionally can include a block 603 of sending a first start quantum message including a first time quantum to each of the registered virtual machines to cause each of the registered virtual machines to execute for the first time quantum in a first round. The first start quantum message can be similar or identical to call 421 (FIG. 4), call 441 (FIG. 4), call 861 (FIG. 8), and/or call 871 (FIG. 8). The first round can be similar to sequence 420 (FIG. 4), sequence 440 (FIG. 4), sequence 860 (FIG. 8), and/or sequence 870 (FIG. 8). The execution for the first time quantum can be similar or identical to execution 422 (FIG. 4), execution 442 (FIG. 4), execution 862 (FIG. 8) and/or execution 872 (FIG. 8). In many embodiments, the first round can be the first round that includes two or more virtual machines being registered as registered virtual machines, even if there are one or more previous rounds of execution with just a single virtual machine being registered. For example, as shown in FIG. 8, the first round referred to in block 603 can be similar to identical to sequence 860 and sequence 870 for virtual machines 321 and virtual machine 322, even though there was a previous round of execution for virtual machine 321 in sequence 820. In a number of embodiments, the first time quantum sent to each of the registered virtual machines can be the same for each of the registered virtual machines. In many embodiments, the first time quantum can represent a virtual wall time duration. In some embodiments, a first actual wall time duration that elapses in executing a first one of the registered virtual machines for the first time quantum, such as in execution 422 (FIG. 4), can be different from a second actual wall time duration that elapses in executing a second one of the registered virtual machines for the first time quantum, such as in execution 442 (FIG. 4). In various embodiments, sending the first start quantum message further can include sending a first virtual wall time to each of the registered virtual machines.

In many embodiments, sending the first start quantum message can include sending the first start quantum message to the first one of the registered virtual machines in the first round before sending the first start quantum message to the second one of the registered virtual machines in the first round, such as shown in calls 421 and 441 of FIG. 4. In some embodiments, sending the first start quantum message to the first one of the registered virtual machines in the first round occurs before registering the second one of the two or more virtual machines as the second one of the registered virtual machines, such as shown in FIG. 4. In other embodiments, the first start quantum message can sent be to all of the registered virtual machines at approximately the same time (or in immediate succession), such as shown in calls 861 and 871 or FIG. 8.

Referring again to FIG. 6, in several embodiments, method 600 further can include a block 604 of receiving a completion indication from each of the registered virtual machines. In many embodiments, the completion indications can be received from each of the registered virtual machines that have been sent a start quantum message, such as the first start quantum message or a subsequent start quantum message. The completion indication can be similar or identical to completion indication 423 (FIG. 4), completion indication 443 (FIG. 4), completion indication 863 (FIG. 8), and/or completion indication 873 (FIG. 8). In many embodiments, each one of the registered virtual machines can send the completion indication after the each one of the registered virtual machines completes executing for the first time quantum in the first round, such as in execution 422 (FIG. 4), execution 442 (FIG. 4), execution 862 (FIG. 8), and/or execution 872 (FIG. 8). In several embodiments, the each one of the registered virtual machines can send the completion indication after the each one of the registered virtual machines completes executing for a second time quantum in a subsequent round, such as in execution 462 (FIG. 4) and/or execution 472 (FIG. 4). In a number of embodiments, after each occurrence of the each one of the registered virtual machines sending the completion indication, the each one of the registered virtual machines can halt execution until receiving a subsequent start quantum message, as described below in block 605. In a number of embodiments, the list of registered virtual machines can be utilized to determine whether completion indications have been received from each of the registered virtual machines.

In a number of embodiments, method 600 additionally can include a block 605 of sending a subsequent start quantum message comprising a second time quantum to each of the registered virtual machines to cause each of the registered virtual machines to execute for the second time quantum in a subsequent round. In many embodiments, block 605 can occur after receiving the completion indications from all of the registered virtual machines in block 604. The subsequent start quantum message can be similar or identical to call 461 (FIG. 4) and/or call 471 (FIG. 4). The subsequent round can be similar or identical to sequence 460 (FIG. 4) and/or sequence 470 (FIG. 4). The execution for the second time quantum can be similar or identical to execution 462 (FIG. 4) and/or execution 472 (FIG. 4). In many embodiments, the second time quantum can be the same in each of the iterations of the subsequent rounds in block 605, and/or the first time quantum can be the same as the second time quantum in each of the iterations of the subsequent rounds in block 605. In other embodiments, the first time quantum can be different from the second time quantum in one or more of the iterations of the subsequent rounds, and/or the second time quantum can be different (e.g., can vary based on predetermined or preconfigured settings) in one or more of the iterations of the subsequent rounds.

In many embodiments, sending the subsequent start quantum message further can include sending a subsequent virtual wall time to each of the registered virtual machines. In several embodiments, the subsequent virtual wall time can be determined by incrementing the first virtual wall time by the first time quantum for a first iteration of sending the subsequent start quantum message, or incrementing the subsequent virtual wall time by the second time quantum for subsequent iterations of sending the subsequent start quantum message.

In some embodiments, the first actual wall time duration that elapses in executing the first one of the registered virtual machines for the first time quantum in the first round can be different from a third actual wall time duration that elapses in executing the first one of the registered virtual machines for the second time quantum in one of the subsequent rounds. For example, the actual wall time duration for execution 422 (FIG. 4) can be different from the actual wall time duration for execution 462 (FIG. 4), and this can be the case even when the first time quantum is the same as the second time quantum.

In several embodiments, method 600 can iteratively repeat blocks 604 and 605 while a quantity of the registered virtual machines is at least a predetermined threshold amount. For example, after completing block 605, method 600 can return directly to block 604, or after optionally completing one or more of blocks 606-611, as described below in further detail. In some embodiments, the predetermined threshold amount is one, such that the time-quantum synchronization approach is implemented whenever any machines are registered. In other embodiments, the predetermined threshold amount is two, such that the time-quantum synchronization approach is implemented when there are two or more registered machines, and if the number of registered virtual machines is one, the single registered virtual machine can proceed with its execution without halting for time-quantum synchronization.

In various embodiments, method 600 optionally can include one or more of blocks 606, 609, and/or 610, as described below, which can involve receiving information that results in updating the list of registered virtual machines. In many embodiments, blocks 607 and 608 can be performed after block 606, and block 611 can be performed after either of blocks 609 and/or 610. In many embodiments, method 600 can return to block 604 after completing blocks 608 and/or 611.

In a number of embodiments, method 600 optionally can include a block 606 of receiving an additional registration request from a third virtual machine. In many embodiments, block 606 can occur after one or more iterations of block 605. The one or more iterations can be any one or more iterations of performing blocks 604 and block 605 in any one of the subsequent rounds. The additional registration request can be similar to call 411 (FIG. 4), call 431 (FIG. 4), call 831 (FIG. 8), and/or call 831 (FIG. 8), but can be for a registering a third virtual machine. The third virtual machine can be similar or identical to virtual machine 323 (FIG. 3).

In several embodiments, method 600 also can include a block 607 of registering the third virtual machine as an additional one of the registered virtual machines in response to receiving the additional registration request from the third virtual machine. In many embodiments, the list of registered virtual machines can be updated to include the third virtual machine. In some embodiments, blocks 606-607 can include calls similar to calls 411-414 (FIG. 4), calls 431-434 (FIG. 4), calls 811-814 (FIG. 8), and/or calls 831-834 (FIG. 8), but can be registering the third virtual machine.

In a number of embodiments, method 600 additionally can include a block 608 of sending the subsequent start quantum message to the third virtual machine to cause the third virtual machine to execute for the second time quantum in the subsequent round. In many embodiments, block 608 can occur after one or more iterations of block 605. The one or more iterations can be any one or more iterations of performing blocks 604 and block 605 in a subsequent round. The subsequent start quantum message can be similar or identical the subsequent start quantum message sent in block 605, and can be similar to call 461 (FIG. 4) and/or call 471 (FIG. 4). The execution for the second time quantum can be similar to execution 462 (FIG. 4) and/or execution 472 (FIG. 4). In many embodiments, after performing block 608, method 600 can return to block 604. In other embodiments, when the third virtual machine is added as a registered virtual machine after a subsequent start quantum message has been sent in a subsequent round, the start quantum message can be sent to the third virtual machine in a following round after the subsequent round, so that after the third virtual machine is registered in block 607, method 600 can proceed to block 604, in which completion indications can be received in from the registered virtual machines that received the subsequent start quantum message (which would not include the third virtual machine), and then method 600 can proceed to block 605, in which a subsequent start quantum message can be sent to the third virtual machine.

In several embodiments, method 600 optionally can include a block 609 of receiving an unregister request from one of the registered virtual machines before receiving the completion indication from the one of the registered virtual machines in a next iteration after the one or more iterations. In many embodiments, block 609 can occur after one or more iterations of block 605, which can be similar or identical to the one or more iterations described in block 606. The one or more iterations can be any one or more iterations of performing blocks 604 and block 605 in any one of the subsequent rounds. In some embodiments, the next iteration can be the iteration of blocks 604 and 605 that occurs immediately subsequent to the one or more iterations. As described above, after performing block 609, method 600 can proceed to block 611, described below.

In a number of embodiments, method 600 optionally can include a block 610 of detecting a time-out condition for one of the registered virtual machines before receiving the completion indication from the one of the registered virtual machines in a next iteration after the one or more iterations. The time-out condition can be similar or identical to the time-out conditions described above In many embodiments, block 610 can occur after one or more iterations of block 605, which can be similar or identical to the one or more iterations described in block 606 or block 609. The one or more iterations can be any one or more iterations of performing blocks 604 and block 605 in any one of the subsequent rounds. In some embodiments, the next iteration can be the iteration of blocks 604 and 605 that occurs immediately subsequent to the one or more iterations, which can be similar or identical to the next iteration in block 609. As described above, after performing block 610, method 600 can proceed to block 611, described below.

In several embodiments, after either of optional blocks 609 or 610, method 600 further can include a block 611 of removing the one of the registered virtual machines from the registered virtual machines. In many embodiments, the list of registered virtual machines can be updated to remove the one of the virtual machines, such that receiving the completion indication from each of the registered virtual machines in the next iteration of block 604 no longer includes the one of the registered virtual machines that was removed, and such that sending the subsequent start quantum message to each of the registered virtual machines in the next iteration of block 605 no longer includes the one of the registered virtual machines that was removed. In many embodiments, after performing block 611, flow can return to block 604.

Figure 7:
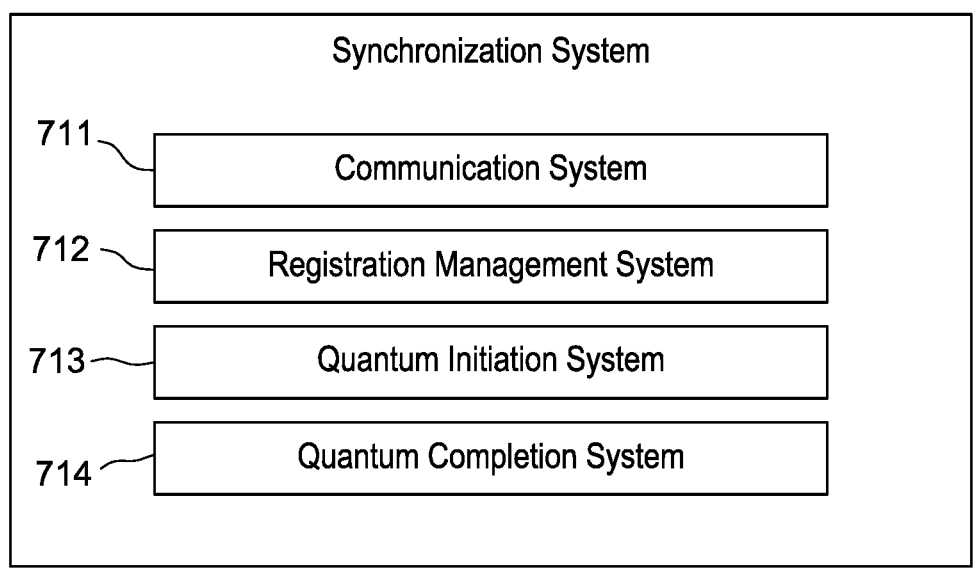
FIG. 7 illustrates a block diagram of the synchronization system of FIG. 3.

Turning ahead in the drawings, FIG. 7 illustrates a block diagram of synchronization system 311, according to the embodiment shown in FIG. 3. Synchronization system 311 is merely exemplary and is not limited to the embodiments presented herein. Synchronization system 311 can be employed in many different embodiments or examples not specifically depicted or described herein. In some embodiments, certain elements or systems of synchronization system 311 can perform various procedures, processes, and/or acts. In other embodiments, the procedures, processes, and/or acts can be performed by other suitable elements or systems. In many embodiments, one or more of the systems of synchronization system 311 can be modules of computing instructions (e.g., software modules) stored at non-transitory computer readable media. In other embodiments, one or more of the systems of synchronization system 311 can be implemented in hardware.

In many embodiments, synchronization system 311 can include a communication system 711. In some embodiments, communication system can include ports 541-543 (FIG. 5). In certain embodiments, communication system 711 can at least partially perform block 601 (FIG. 6) of receiving a registration request from each of two or more virtual machines, block 603 (FIG. 6) of sending a first start quantum message including a first time quantum to each of the registered virtual machines to cause each of the registered virtual machines to execute for the first time quantum in a first round, block 604 (FIG. 6) of receiving a completion indication from each of the registered virtual machines, block 605 (FIG. 6) of sending a subsequent start quantum message comprising the second time quantum to each of the registered virtual machines to cause each of the registered virtual machines to execute for the second time quantum in a subsequent round, block 606 (FIG. 6) of receiving an additional registration request from a third virtual machine, block 608 (FIG. 6) of sending the subsequent start quantum message to the third virtual machine to cause the third virtual machine to execute for the second time quantum in the subsequent round, and/or block 609 (FIG. 6) of receiving an unregister request from one of the registered virtual machines before receiving the completion indication from the one of the registered virtual machines in a next iteration after the one or more iterations.

In a number of embodiments, synchronization system 311 can include a registration management system 712. In certain embodiments, registration management system 712 can at least partially perform block 601 (FIG. 6) of receiving a registration request from each of two or more virtual machines, block 602 (FIG. 6) of registering the each of the two or more virtual machines as a registered virtual machine in response to receiving the registration request from the each of the two or more virtual machines, block 606 (FIG. 6) of receiving an additional registration request from a third virtual machine, block 607 (FIG. 6) of registering the third virtual machine as an additional one of the registered virtual machines in response to receiving the additional registration request from the third virtual machine, block 609 (FIG. 6) of receiving an unregister request from one of the registered virtual machines before receiving the completion indication from the one of the registered virtual machines in a next iteration after the one or more iterations, block 610 (FIG. 6) of detecting a time-out condition for one of the registered virtual machines before receiving the completion indication from the one of the registered virtual machines in a next iteration after the one or more iterations, and/or block 611 (FIG. 6) of removing the one of the registered virtual machines from the registered virtual machines.

In many of embodiments, synchronization system 311 can include a quantum initiation system 713. In certain embodiments, quantum initiation system 713 can at least partially perform block 603 (FIG. 6) of sending a first start quantum message including a first time quantum to each of the registered virtual machines to cause each of the registered virtual machines to execute for the first time quantum in a first round, block 605 (FIG. 6) of sending a subsequent start quantum message comprising the second time quantum to each of the registered virtual machines to cause each of the registered virtual machines to execute for the second time quantum in a subsequent round, and/or block 608 (FIG. 6) of sending the subsequent start quantum message to the third virtual machine to cause the third virtual machine to execute for the second time quantum in the subsequent round.

In a number of embodiments, synchronization system 311 can include a quantum completion system 714. In certain embodiments, quantum completion system 714 can at least partially perform block 604 (FIG. 6) of receiving a completion indication from each of the registered virtual machines, and/or block 610 (FIG. 6) of detecting a time-out condition for one of the registered virtual machines before receiving the completion indication from the one of the registered virtual machines in a next iteration after the one or more iterations.

In many embodiments, the techniques described herein can provide several technological improvements. Specifically, in some embodiments, the techniques described herein can beneficially facilitate performing simulations that include multiple hardware systems that communicate with each other. In several embodiments, the techniques described herein can advantageously solve the problem of communication timing skews that result from multiple virtual machines each running at speeds that do not match, or are not proportional to, the execution speeds of the hardware that is virtualized by the virtual machines.

In many embodiments, the techniques described herein can beneficially result in simulations that run much faster than approaches that synchronize each virtual machine on every clock cycle. For example, the techniques described herein can advantageously facilitate time synchronization using time-quantum synchronization at the interface of the hardware and software interaction, rather than at the clock level, which can improve the speed at which the simulation proceeds by not stopping every clock cycle. Instead of halting to clock out each bit of communication across the virtual machines, an entire packet of data, for example, can be communicated between virtual machines in a single round before halting execution by using the techniques described herein. For example, the time quantum can provide an amount of time without dictating clock cycle amounts for each virtual machine. In several embodiments, each virtual machine can perform as much work as possible, or as much work as it chooses, during each time quantum allocated. In many embodiments, the techniques described herein can advantageously allow the registered virtual machines to execute for the time quantum simultaneously rather than in a serial fashion.

In a number of embodiments, the techniques described herein can advantageously facilitate simulating multiple hardware systems that communicate using multiple different communication buses, and these different communications can be deterministically and reproducibly executed in the simulations. In several embodiments, the techniques described herein can beneficially allow the simulation to handle any type of communication bus.

In many embodiments, the techniques described herein can advantageously allow virtual machines to join and/or leave the simulation during the running of the simulation. For example, if a virtual machine drops out, the simulation can detect that the machine has dropped and remove it without locking-up the simulation. In several embodiments, the techniques described herein can beneficially allow the entire simulation of all the virtual machines to be paused for as long as desired by waiting to send a subsequent time quantum to the virtual machines. In a number of embodiments, the techniques described herein advantageously can be implemented on a distributed system that includes multiple host machines.

Various embodiments include a system including one or more processors and one or more non-transitory computer-readable media storing computing instructions configured to run on the one more processors and perform certain acts. The acts can include receiving a registration request from each of two or more virtual machines. The acts also can include registering the each of the two or more virtual machines as a registered virtual machine in response to receiving the registration request from the each of the two or more virtual machines. The acts additionally can include sending a first start quantum message including a first time quantum to each of the registered virtual machines to cause each of the registered virtual machines to execute for the first time quantum in a first round. The first time quantum sent to each of the registered virtual machines can be the same. The first time quantum can represents a virtual wall time duration. A first actual wall time duration that elapses in executing a first one of the registered virtual machines for the first time quantum can be different from a second actual wall time duration that elapses in executing a second one of the registered virtual machines for the first time quantum. The acts further can include, while a quantity of the registered virtual machines is at least a predetermined threshold amount, iteratively performing: receiving a completion indication from each of the registered virtual machines; and after receiving the completion indications from all of the registered virtual machines, sending a subsequent start quantum message comprising a second time quantum to each of the registered virtual machines to cause each of the registered virtual machines to execute for the second time quantum in a subsequent round.

A number of embodiments include a method being implemented via execution of computing instructions configured to run at one or more processors and stored at one or more non-transitory computer-readable media. The method can include receiving a registration request from each of two or more virtual machines. The method also can include registering the each of the two or more virtual machines as a registered virtual machine in response to receiving the registration request from the each of the two or more virtual machines. The method additionally can include sending a first start quantum message including a first time quantum to each of the registered virtual machines to cause each of the registered virtual machines to execute for the first time quantum in a first round. The first time quantum sent to each of the registered virtual machines can be the same. The first time quantum can represents a virtual wall time duration. A first actual wall time duration that elapses in executing a first one of the registered virtual machines for the first time quantum can be different from a second actual wall time duration that elapses in executing a second one of the registered virtual machines for the first time quantum. The method further can include, while a quantity of the registered virtual machines is at least a predetermined threshold amount, iteratively performing: receiving a completion indication from each of the registered virtual machines; and after receiving the completion indications from all of the registered virtual machines, sending a subsequent start quantum message comprising a second time quantum to each of the registered virtual machines to cause each of the registered virtual machines to execute for the second time quantum in a subsequent round.

Although embodiments of a virtual communication router with time-quantum synchronization have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 4-6 and 8 may include different procedures, processes, and/or activities and be performed by many different modules, in many different orders, and/or one or more of the procedures, processes, or activities of FIGS. 4-6 and 8 may include one or more of the procedures, processes, or activities of another different one of FIGS. 4-6 and 8. As another example, the systems within virtual communication router 310 (FIG. 3) and/or synchronization system 311 (FIGS. 3, 7) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
  receiving a registration request from each of two or more virtual machines;
  registering the each of the two or more virtual machines as a registered virtual machine in response to receiving the registration request from the each of the two or more virtual machines;
  sending a first start quantum message comprising a first time quantum to each of the registered virtual machines to cause each of the registered virtual machines to execute for the first time quantum in a first round, wherein the first time quantum sent to each of the registered virtual machines is the same, the first time quantum represents a virtual wall time duration, and a first actual wall time duration that elapses in executing a first one of the registered virtual machines for the first time quantum is different from a second actual wall time duration that elapses in executing a second one of the registered virtual machines for the first time quantum; and
while a quantity of the registered virtual machines is at least a predetermined threshold amount, iteratively performing:
  receiving a completion indication from each of the registered virtual machines;
  after receiving the completion indications from all of the registered virtual machines, sending a subsequent start quantum message comprising a subsequent time quantum to each of the registered virtual machines to cause each of the registered virtual machines to execute for the subsequent time quantum in a subsequent round; and
  after one or more iterations of sending the subsequent start quantum message to each of the registered virtual machines:
    receiving an unregister request from one of the registered virtual machines before receiving the completion indication from the one of the registered virtual machines in a next iteration after the one or more iterations;
    removing and unregistering the one of the registered virtual machines from the registered virtual machines;
    receiving the completion indication from each of the registered virtual machines that remain in the next iteration after the removing and unregistering of the one of the registered virtual machines; and
    sending the subsequent start quantum message to each of the registered virtual machines that remain in the next iteration after receiving the completion indication from each of the registered virtual machines that remain.

2. The system of claim 1, wherein:
each one of the registered virtual machines sends the completion indication after each one of the registered virtual machines completes executing for the first time quantum in the first round;
each one of the registered virtual machines sends the completion indication after each one of the registered virtual machines completes executing for the subsequent time quantum in the subsequent round; and
after each occurrence of each one of the registered virtual machines sending the completion indication, each one of the registered virtual machines halts execution until receiving the subsequent start quantum message.

3. The system of claim 1, wherein: the first actual wall time duration that elapses in executing the first one of the registered virtual machines for the first time quantum in the first round is different from a third actual wall time duration that elapses in executing the first one of the registered virtual machines for the subsequent time quantum in one of the subsequent rounds.

4. The system of claim 1, wherein: sending the first start quantum message further comprises sending a first virtual wall time to each of the registered virtual machines.

5. The system of claim 4, wherein:
sending the subsequent start quantum message further comprises sending a subsequent virtual wall time to each of the registered virtual machines; and
the subsequent virtual wall time is determined by:
  incrementing the first virtual wall time by the first time quantum for a first iteration of sending the subsequent start quantum message; and
  incrementing the subsequent virtual wall time by the subsequent time quantum for subsequent iterations of sending the subsequent start quantum message.

6. The system of claim 1, wherein:
registering each of the two or more virtual machines comprises: registering a first one of the two or more virtual machines as the first one of the registered virtual machines before registering a second one of the two or more virtual machines as the second one of the registered virtual machines; and
sending the first start quantum message comprises: sending the first start quantum message to all of the registered virtual machines in the first round.

7. The system of claim 1, wherein the computing instructions are further configured to perform, after the one or more iterations of sending the subsequent start quantum message to each of the registered virtual machines:
receiving an additional registration request from a third virtual machine;
registering the third virtual machine as an additional one of the registered virtual machines in response to receiving the additional registration request from the third virtual machine; and
sending the subsequent start quantum message to the third virtual machine to cause the third virtual machine to execute for the subsequent time quantum in the subsequent round.

8. The system of claim 1, wherein the computing instructions are further configured to perform, after the one or more iterations of sending the subsequent start quantum message to each of the registered virtual machines:

detecting a time-out condition for one of the registered virtual machines before receiving the completion indication from the one of the registered virtual machines in the next iteration after the one or more iterations;

removing and unregistering the one of the registered virtual machines from the registered virtual machines;

receiving the completion indication from each of the registered virtual machines that remain in the next iteration after the removing and unregistering of the one of the registered virtual machines; and sending the subsequent start quantum message to each of the registered virtual machines that remain in the next iteration after receiving the completion indication from each of the registered virtual machines that remain.

9. The system of claim 1, wherein: the predetermined threshold amount is one.

10. The system of claim 1, wherein:
the first one of the registered virtual machines executes on a first host machine;
the second one of the registered virtual machines executes on a second host machine; and
the first host machine is different from the second host machine.

11. The system of claim 1, wherein: the first time quantum is the same as the subsequent time quantum in each iteration of the subsequent rounds.

12. A method being implemented via execution of computing instructions configured to run on one or more processors and stored on one or more non-transitory computer-readable media, the method comprising:
receiving a registration request from each of two or more virtual machines;
registering the each of the two or more virtual machines as a registered virtual machine in response to receiving the registration request from the each of the two or more virtual machines;
sending a first start quantum message comprising a first time quantum to each of the registered virtual machines to cause each of the registered virtual machines to execute for the first time quantum in a first round, wherein the first time quantum sent to each of the registered virtual machines is the same, the first time quantum represents a virtual wall time duration, and a first actual wall time duration that elapses in executing a first one of the registered virtual machines for the first time quantum is different from a second actual wall time duration that elapses in executing a second one of the registered virtual machines for the first time quantum; and
while a quantity of the registered virtual machines is at least a predetermined threshold amount, iteratively performing:
receiving a completion indication from each of the registered virtual machines;
after receiving the completion indications from all of the registered virtual machines, sending a subsequent start quantum message comprising a subsequent time quantum to each of the registered virtual machines to cause each of the registered virtual machines to execute for the sec-end subsequent time quantum in a subsequent round; and
after one or more iterations of sending the subsequent start quantum message to each of the registered virtual machines:
receiving an unregister request from one of the registered virtual machines before receiving the completion indication from the one of the registered virtual machines in a next iteration after the one or more iterations;
removing and unregistering the one of the registered virtual machines from the registered virtual machines;
receiving the completion indication from each of the registered virtual machines that remain in the next iteration after the removing and unregistering of the one of the registered virtual machines; and
sending the subsequent start quantum message to each of the registered virtual machines that remain in the next iteration after receiving the completion indication from each of the registered virtual machines that remain.

13. The method of claim 12, wherein:
each one of the registered virtual machines sends the completion indication after each one of the registered virtual machines completes executing for the first time quantum in the first round;
each one of the registered virtual machines sends the completion indication after each one of the registered virtual machines completes executing for the subsequent time quantum in the subsequent round; and
after each occurrence of each one of the registered virtual machines sending the completion indication, each one of the registered virtual machines halts execution until receiving the subsequent start quantum message.

14. The method of claim 12, wherein: the first actual wall time duration that elapses in executing the first one of the registered virtual machines for the first time quantum in the first round is different from a third actual wall time duration that elapses in executing the first one of the registered virtual machines for the subsequent time quantum in one of the subsequent rounds.

15. The method of claim 12, wherein: sending the first start quantum message further comprises sending a first virtual wall time to each of the registered virtual machines.

16. The method of claim 15, wherein:
sending the subsequent start quantum message further comprises sending a subsequent virtual wall time to each of the registered virtual machines; and
the subsequent virtual wall time is determined by:
incrementing the first virtual wall time by the first time quantum for a first iteration of sending the subsequent start quantum message; and
incrementing the subsequent virtual wall time by the subsequent time quantum for subsequent iterations of sending the subsequent start quantum message.

17. The method of claim 12, wherein:
registering each of the two or more virtual machines comprises: registering a first one of the two or more virtual machines as the first one of the registered virtual machines before registering a second one of the two or more virtual machines as the second one of the registered virtual machines; and
sending the first start quantum message comprises: sending the first start quantum message to all of the registered virtual machines in the first round.

18. The method of claim 12, further comprising, after the one or more iterations of sending the subsequent start quantum message to each of the registered virtual machines:
receiving an additional registration request from a third virtual machine;

registering the third virtual machine as an additional one of the registered virtual machines in response to receiving the additional registration request from the third virtual machine; and sending the subsequent start quantum message to the third virtual machine to cause the third virtual machine to execute for the subsequent time quantum in the subsequent round.

19. The method of claim 12, further comprising, after the one or more iterations of sending the subsequent start quantum message to each of the registered virtual machines:

detecting a time-out condition for one of the registered virtual machines before receiving the completion indication from the one of the registered virtual machines in the next iteration after the one or more iterations;

removing and unregistering the one of the registered virtual machines from the registered virtual machines;

receiving the completion indication from each of the registered virtual machines that remain in the next iteration after the removing and unregistering of the one of the registered virtual machines; and sending the subsequent start quantum message to each of the registered virtual machines that remain in the next iteration after receiving the completion indication from each of the registered virtual machines that remain.

20. The method of claim 12, wherein: the predetermined threshold amount is one.

21. The method of claim 12, wherein:

the first one of the registered virtual machines executes on a first host machine;

the second one of the registered virtual machines executes on a second host machine; and the first host machine is different from the second host machine.

22. The method of claim 12, wherein: the first time quantum is the same as the subsequent time quantum in each iteration of the subsequent rounds.

* * * * *

UNITED STATES PATENT AND TRADEMARK OFFICE
CERTIFICATE OF CORRECTION

PATENT NO. : 10,628,204 B2
APPLICATION NO. : 15/906336
DATED : April 21, 2020
INVENTOR(S) : Merrill et al.

It is certified that error appears in the above-identified patent and that said Letters Patent is hereby corrected as shown below:

In the Claims

In Claim 12, Column 31, Line 61:
"execute for the sec-end subsequent time quantum in"

Should be changed to read:
--execute for the subsequent time quantum in--

Signed and Sealed this
Twenty-eighth Day of March, 2023

Katherine Kelly Vidal
*Director of the United States Patent and Trademark Office*